United States Patent [19]

Lee

[11] Patent Number: 5,166,788
[45] Date of Patent: Nov. 24, 1992

[54] MOTION SIGNAL PROCESSOR

[75] Inventor: Myeong-Hwan Lee, Seoul, Rep. of Korea

[73] Assignee: Samsung Electronics Co., Ltd., Kyungki, Rep. of Korea

[21] Appl. No.: 545,486

[22] Filed: Jun. 29, 1990

[51] Int. Cl.⁵ .............................................. H04N 5/21
[52] U.S. Cl. ..................................... 358/105; 358/167
[58] Field of Search ................. 358/105, 167, 31, 160

[56] References Cited

U.S. PATENT DOCUMENTS

| | | | |
|---|---|---|---|
| 4,539,594 | 9/1985 | Illetschko | 358/167 |
| 4,730,217 | 3/1988 | Tonge et al. | 358/105 X |
| 4,733,297 | 3/1988 | Katsumata et al. | 358/105 |
| 4,868,650 | 9/1989 | Weckenbrock | 358/105 |

Primary Examiner—Victor R. Kostak
Attorney, Agent, or Firm—Robert E. Bushnell

[57] ABSTRACT

The present invention relates to a motion signal processor in which a motion signal for a video signal is generated by frame difference circuit. The resultant signal is spatially low-pass filtered. The absolute value of the motion signal is calculated. Spatial correlation is imposed on the motion signal by assigning each sample the greatest value of a series of samples within an image window. The motion signal samples are then compared to a threshold value to generate a 1-bit signal. From the 1-bit signal a motion area is presumed by adaptively smoothing the motion signal based upon its the spatial correlation.

83 Claims, 23 Drawing Sheets

|   |   |   |   |   |   |   |   |   |   |   |   |
|---|---|---|---|---|---|---|---|---|---|---|---|
| o | 0 | 0 | 0 | 0 | 1 | 1 | 1 | 0 | 0 | 0 | ; o=o |
| p | 0 | 0 | 0 | 1 | 1 | 1 | 1 | 0 | 0 | 0 | ; p=DELAY(o) |
| q | 0 | 0 | 0 | 1 | 1 | 1 | 1 | 0 | 0 | 0 | ; q=MAX(p,o) |
| r | 0 | 0 | 1 | 1 | 1 | 1 | 0 | 0 | 0 | 0 | ; r=DELAY(p) |
| s | 0 | 1 | 1 | 1 | 1 | 1 | 1 | 0 | 0 | 0 | ; s=MAX(r,q) |

SPREAD MOTION ← → ORIGINAL MOTION

*FIG. 13B*

| | | |
|---|---|---|
| a | 0 0 0 0 0 0 0 1 1 1 0 0 0 0 | |
| b | 0 0 0 0 0 1 1 1 1 1 0 0 0 0 | |
| c | 0 0 0 1 1 1 1 1 0 0 0 0 0 0 | |
| d | 0 0 0 1 1 1 1 1 1 1 0 0 0 0 | |
| e | 0 0 1 1 1 1 1 1 1 0 0 0 0 0 | |
| f | 0 1 1 1 1 1 1 1 1 1 0 0 0 0 | |
| g | 0 0 0 0 1 1 1 0 0 0 0 0 0 0 | |
| h | 0 1 2 3 4 4 4 3 2 1 0 0 0 0 | $h\overset{*}{=}c+e+f+g$ |

In row h: positions 2-4 (<u>1 2 3</u>) = SPREAD MOTION; positions 5-10 (<u>4 4 4 3 2 1</u>) = ORIGINAL MOTION

*FIG. 14B*

```
0000011110000        0000000000000        0000011110000
0000022220000        0000000000000        0000022220000
0000033330000        0000000000000        0000033330000
0000044440000        0012344443 21        0000044443 21
0000044443000        0012344443210        0000044443210
0000044423000        0001234443210        0000044423210
0000023310000        0000000000000        0000023310000
0000012200000        0000000000000        0000012200000
0000001100000        0000000000000        0000001100000
      III                  II                   V 0000011110000
                                           0000122222100
                                           0012333333210
                                           0012344443 21
                                           0012344443210
                                           0001234443210
                                           0°000233 1000
                                           0000012 20000
                                           0000001 10000

MOTION SIGNAL PROCESSOR

BACKGROUND OF THE INVENTION

This invention relates, in general, to a motion signal processing system for digital televisions. In particular, the present invention relates to a circuit for smoothing image signals distributed in a boundary region of a motion image and a still image by spreading the transition between the two regions, in which the circuit re-constructs the temporally processed motion signal into a spatially processed motion signal.

A digital video signal processing system, which is widely researched recently, uses large memories and, in this case, in order to obtain a good quality displayed image, the digital video signal processing system frequently uses frame memories. The video signal processing system utilizing frame memories uses the comb-filters so as to easily separate the luminance signals and the chrominance signals from composite video signals. These comb-filters work well for the still images which do not contain image motion. However, it is a disadvantage of the above technique that, around motion areas, distortion appears which greatly reduces the quality of the displayed image.

In order to avoid such degradation of the image near motion, it becomes necessary to switch from the frame combed signal to some kind of substitution signal that provides a better quality than the frame combed signal. By the way, there are proposed two methods for achieving the switching operation between the two signals, i.e., one is a hard switching and the other is a soft switching technique.

The hard switching, as the result of the motion detection, has only two states (1; motion area, or 0; still area) with no intermediate states. Therefore, when this hard switching is employed, a new degradation of the displayed image will be incurred. This degradation of the image is basically caused by the difference in resolution between the frame combed signal and the substitutional signal of better quality. Another very noticeable distortion appears when the substitution signal consists of a line combed signal. In this case, hanging dots appear along moving horizontal transitions.

This distortion becomes especially annoying when the image contains a lot of moving high frequency detail, and the system therefore rapidly switches between two differently processed signals.

Therefore, for a digital video signal processor, it is desirable to have a soft switch which provides gradual transitions between moving and stationary portions of the picture. A general motion signal processing system for implementing this soft switching is as schematically shown in FIG. 1.

Referring to FIG. 1, it is an exemplary illustration of a 1-bit motion signal spreader. However, for a full bit motion signal processing, the motion detector 100 and control signal spreader 102 should respectively be replaced by a motion detector for producing full bit motion signals and a K value generator for generating K values of 0 to 1.

Namely, as shown from the drawing, a general motion signal processing system includes essentially the motion detector 100 for detecting motion signals from the composite video signal input, and the control signal spreader 102 for processing the motion signals provided from the motion detector 100 so as to generate the spread control signal of K and $1-K$ values. Furthermore, a spatial processor 106 spatially processes the composite video signal input by using line comb-filters and a temporal processor 110 temporally processes the composite video signal input by using frame comb-filters. The respective outputs of the spatial processor 106 and the temporal processor 110 are mixed with the control signal output of K value and $1-K$ value provided from the control signal spreader 102 by virtue of multipliers 112 and 114, respectively. In this case, the control signal is of $0<K<1$. The respective outputs of the multipliers 112 and 114 are mixed by a adder 116 to produce motion processed image signals. Since the composite video signal input is delayed during processing by the motion detector 100 and the control signal spreader 102, delay circuits 104 and 108 delay the composite video signal input in order to match control signal K and $1-K$ values with the outputs of the spatial processor 106 and the temporal processor 110.

Referring to FIG. 2, it is a block diagram for showing the structure of the motion detector 100 and the control signal spreader 102 according to a prior art, in which a frame difference circuit 118 receives the composite video signal or luminance signal and detects a motion difference signal between frames. A spatial low pass filter 120 spatially lowpass-filters the frame difference signal provided from the frame difference circuit 118 so as to smooth the motion difference signal and restrict the color signal. An absolute value circuit 122 produces absolute values of the signal output from the spatial lowpass filter 120. The absolute values are compared with a predetermined threshold value by a comparator 124 which generates the 1-bit control signal according to the comparison. Then, the 1-bit control signal is spread by a spreading processor 126 and the K values are then generated by the K value generator 132. Herein, the K values have continuous values of $0 \leq K \leq 1$ when a K value is 1, the motion of image is very significant and when the K value is 0, the motion of image is none.

Since this prior art motion signal processor forcefully performs the spreading process centering around a detected motion signal, regarding the detected 1-bit motion signal as a motion signal (K=1) of which motion is very considerable, the motion signal can not be spread adaptively. Accordingly, when a lot of moving high-frequency detail is processed, the degradation of the displayed image can not be avoided successfully. Furthermore, when image signals contain impulse noise, the impulse noise may be misconceived as motion signals and thus spreading of undesired image signals occurs. In addition, since this structure detects only motion signals correlated to the direction of time axis in accordance with only the frame difference signal, the motion signal has little spatial correlation. Therefore, it is difficult to process the motion signal spatially adaptively according to the motion area.

SUMMARY OF THE INVENTION

It is an object of the present invention to provide a motion signal processor for spreading motion signals by utilizing 1-bit control signals.

It is another object of the present invention to provide a motion signal processor for facilitating hard switching and soft switching by spreading the motion signals spatially.

It is another object of the present invention to provide a motion signal processor which detects the maximum value of the motion signals by means of the frame difference signal of an image window so as to produce 1-bit control signals by comparing the maximum value with a predetermined threshold value.

It is another object of the present invention to provide a motion signal processor for spreading motion of the image signals, according to the presence of the 1-bit control signal obtained by comparing a full bit frame difference signal with a predetermined threshold value.

It is another object of the present invention to provide a motion signal processor for detecting area of the motion signals to adaptively spread the motion.

It is another object of the present invention to provide a motion signal processor for spreading the motion signals diagonally along with horizontally and vertically, to further smooth the motion signals.

It is another object of the present invention to provide a motion signal processor in which the step number of the control signal is optimally minimized so as to simplify the structure of the system.

It is another object of the present invention to provide a motion signal processor which utilizes 1-bit, not full bit, during the motion signal process, so that the hardware is simplified.

It is still another object of the present invention to spatially spread the motion signal over a specific value by detecting the maximum value of an image window and a motion signal processor for reconstructing (or presuming) the motion adaptively by using the spread motion signal according to the spatial motion area of the motion signal.

According to the present invention, in order to accomplish the above objects and other features, the inventive digital video signal processor includes: a circuit for detecting an frame difference signal; a spatial lowpass filter coupled to the detection circuit, for spatially lowpass-filtering the frame difference signal; a circuit coupled to the spatial lowpass filter, for producing an absolute value of the spatially lowpassed signal; a circuit coupled to the absolute value circuit, for determining maximum value of the absolute value so as to provide the motion signal with spatial correlation; a circuit operably coupled to the maximum valve circuit, for comparing the maximum value provided from the maximum valve circuit with a predetermined reference level; a circuit coupled to the comparison circuit, for presuming the motion signal area from the result comparison signal of the comparison circuit to adaptively smooth the motion signal; and a circuit coupled to the area presumption circuit, for generating motion factors by processing the area presumption signal; whereby the motion signal is spread smoothly, based on the spatial correlation by virtue of the spatial spreading of the temporal motion signal of the frame difference signal and by means of the motion signal presumed by the spatial correlation of the motion signal.

BRIEF DESCRIPTION OF THE DRAWINGS

For a better understanding of the invention and to show how the same may be carried into effect, reference will now be made, by way of example, to the accompanying diagrammatic drawings, in which:

FIG. 7D shows an exemplary diagram for explaining the spreading of image signal in case of "3×3" rectangular image window;

FIG. 7E shows an exemplary diagram for explaining the spreading of image signal in case of "5×5" diamond image window;

FIGS. 13A and 13B show detailed circuit diagram of the basic block cells of FIG. 12 and their processed values;

FIGS. 14A and 14B show a detailed circuit diagram of the horizontal spreader of FIG. 12 completed by utilizing the basic block cells and the intermediate values thereof; and FIG. 15 shows the result of image signal spreading accomplished by the spatial spreader of FIG. 11A.

DETAILED DESCRIPTION OF THE PREFERRED EMBODIMENTS

Figure 1:
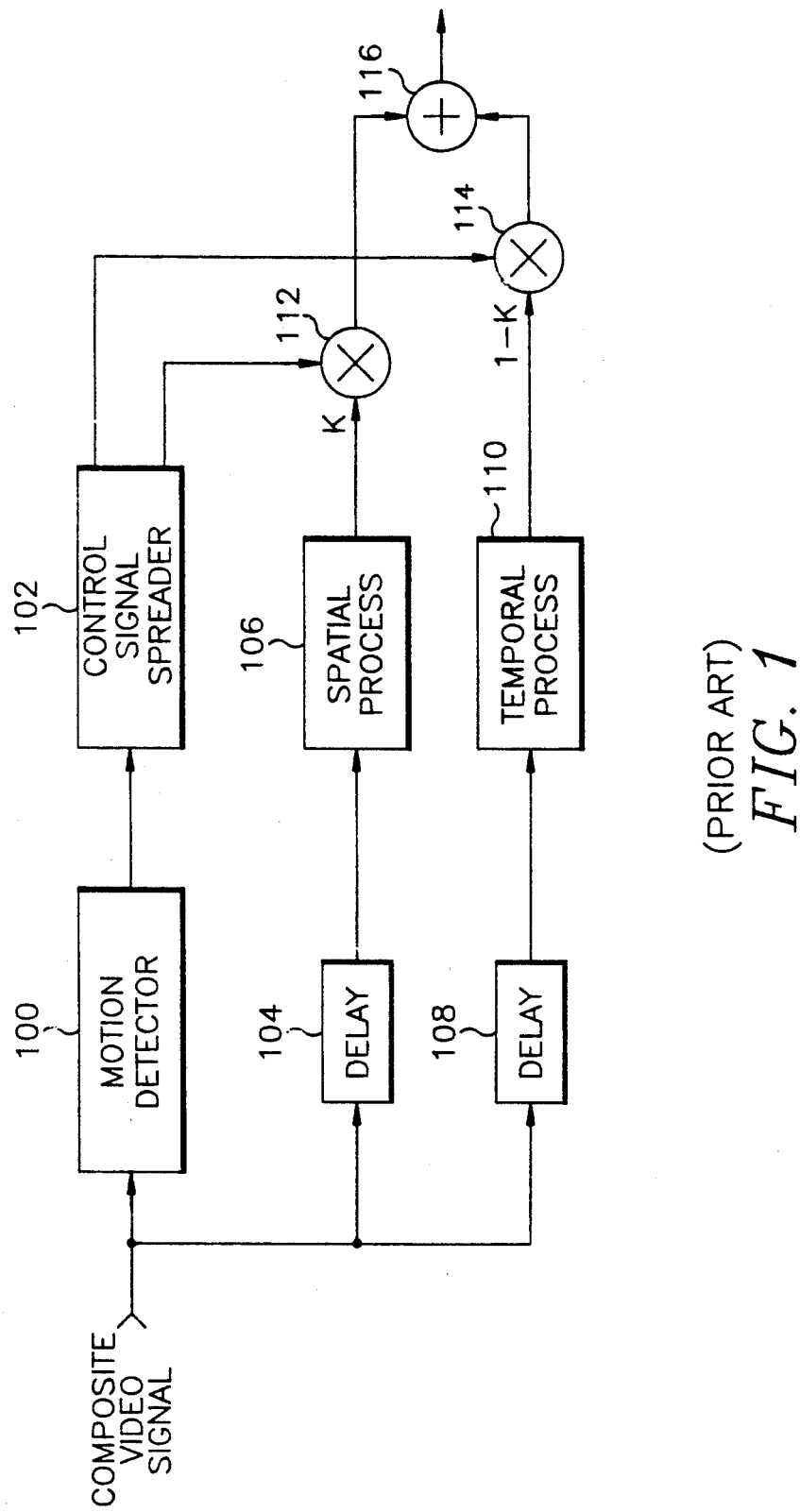
FIG. 1 shows a block diagram of a motion signal processor utilizing a conventional spreading method.

The embodiments of the invention will now be described in detail hereinafter with reference to the accompanying drawings, in which the like reference numerals refer to the like parts and the equivalents.

Figure 2:
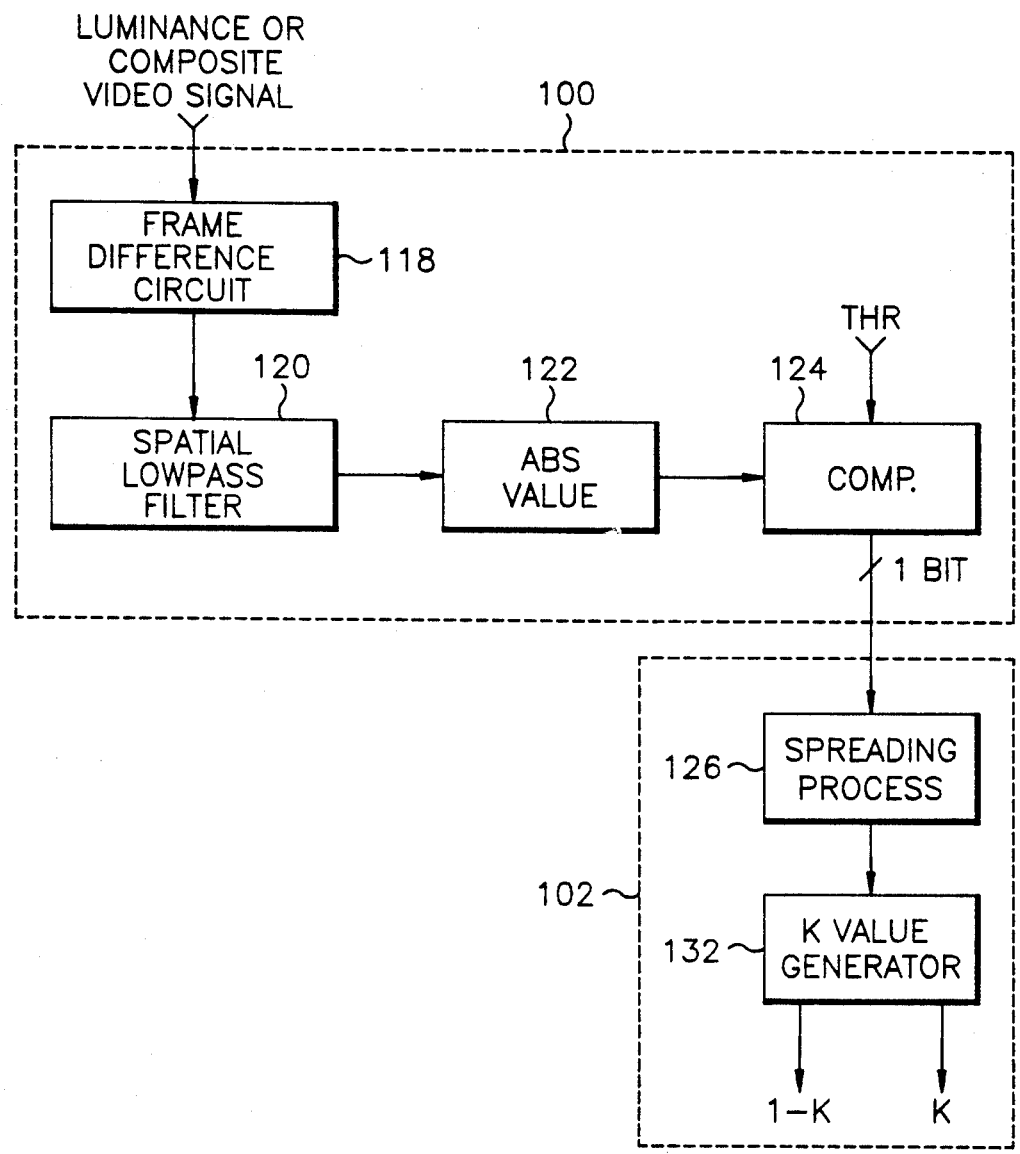
FIG. 2 shows a block diagram for explaining the motion detector and control signal spreader of FIG. 1 according to the prior art.
Figure 3:
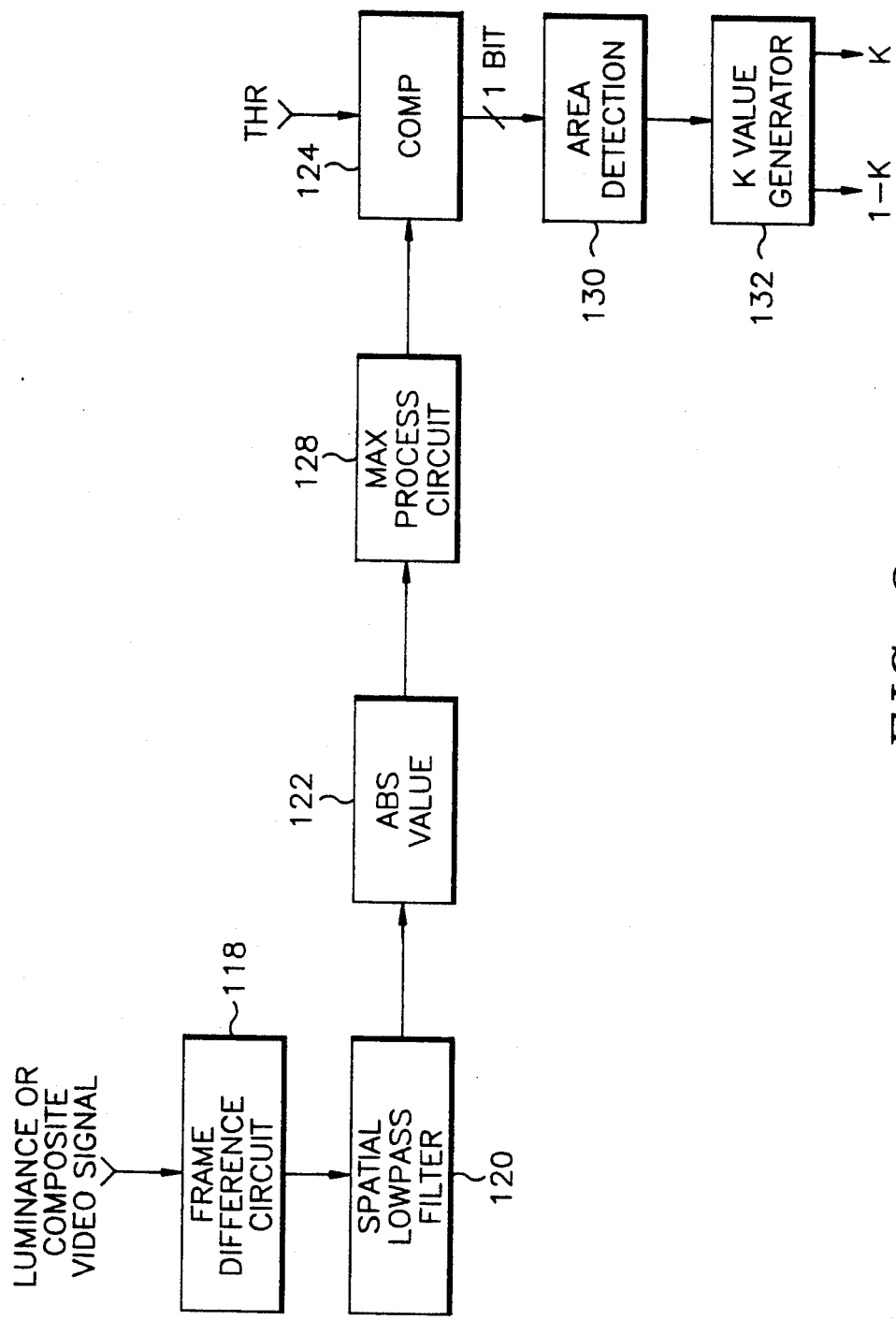
FIG. 3 shows schematically an embodiment of a motion signal processor according to the present invention.

First of all, referring to FIG. 3 which is the basic block diagram of the invention, the operation and structure of the frame difference circuit 118, the spatial lowpass filter 120, the absolute value circuit 122 and the comparator 124 are the the same as those of the prior art explained in relation to FIG. 2. In other words, the frame difference detector 118 detects the motion signal differences between the frames, which are applied to the spatial lowpass filter 120 for filtering a low frequency component of the frame difference signal. The output of the spatial lowpass filter 120 consists of positive and negative components and this signal is changed to an absolute value (positive value) by the absolute value circuit 122. The maximum value selection circuit 128, which receives the absolute value, selects the maximum value of the signals for "M×N" image window in order to spread spatially the motion centering on the selected maximum value, in which the smoothing effect is determined according to the selection of the shape of the image window. According to an experiment rectangular and diamond image windows had a good smoothing effect even for very high-frequency detail. In particular, when the frame difference signal is placed around the boundary between the motion region and still region, this invention has obtained a more outstanding effect.

The size and shape of the image window should be properly adjusted. If the size of the image window is unnecessarily big, the quality of the image can be degraded due to excessive spreading of the motion.

Figure 9A:
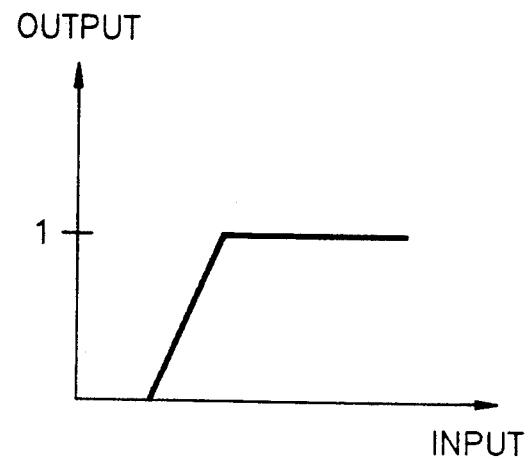
FIGS. 9A and 9B show the output characteristics of the K value generator of FIG. 3.
Figure 9B:
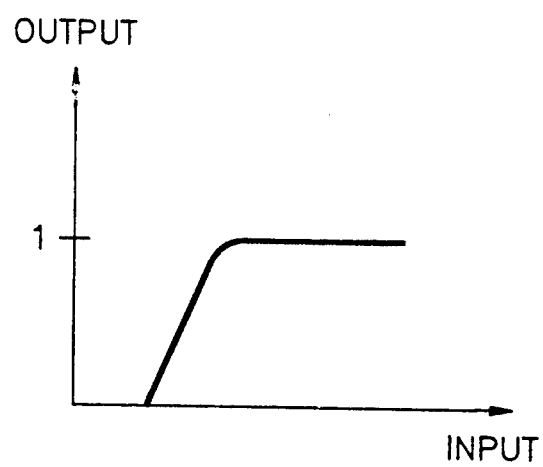

Since output of the maximum value detector 128 is a spatially spread signal, it can be used as a motion control signal for controlling the soft switching directly by means of the K value generator which has the characteristics as shown in FIGS. 9A and 9B. In addition, the output of the maximum value detector 128 is compared with a threshold value set in advance by the comparator 124. At this moment, if the signal output of the maximum value detector 128 is decided to be greater than the threshold value THR, then the value selected by the maximum value selector 128 is recognized as a maximum value and thus the comparator 124 will produce a 1-bit motion signal. Such a motion signal means that the motion detected in relation to the temporal axis is a signal component of which motion is greater than the threshold value THR, and this signal is the value which is spread spatially by means of the maximum value detector 128. Therefore, it is possible for this motion signal to be used for the hard switching.

The purpose of the area detector 130, which receives the above 1-bit motion signal, is to reconstruct image signal spatially rather than spread the motion. In this case, the image reconstruction is implemented by detecting a new motion area of the image window by using the motion which excesses over a specific value, in which the motion is spatially spread by the maximum value selector 128 by means of selecting the maximum value of the image window, and reconstructing the motion spatially according to the motion of the image window.

In other words, the area detector 130 processes the motion signal again which is corrected in advance by the maximum value detector 128 so as to presume the spatial correlation of the new motion signal and this newly presumed motion is applied to the K value generator 132 which is to generate the motion factor K value. In the mean time, by properly restricting the maximum value of the output from the area detector 130, the motion process is simplified and in case of a wide image widow, the great difference between the center of the motion region and the still region can be overcome. The K and 1-K values are applied to the multipliers 112, 114 shown in FIG. 1 and thus mixed with the outputs from the spatial processor 106 and the temporal processor 110.

Figure 7A:
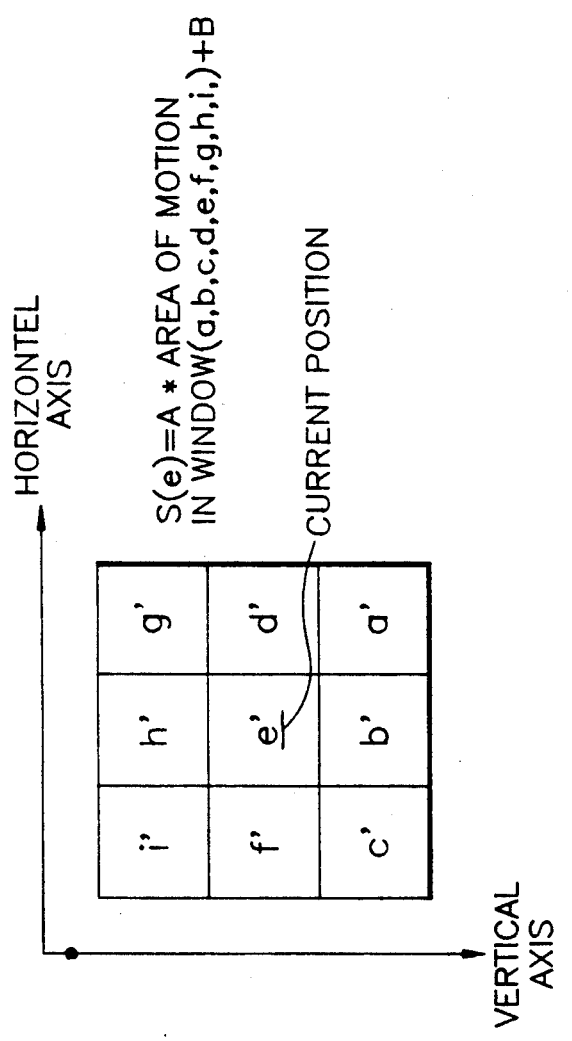
FIG. 7A shows an exemplary image window obtained by the area detector.
Figure 7B:
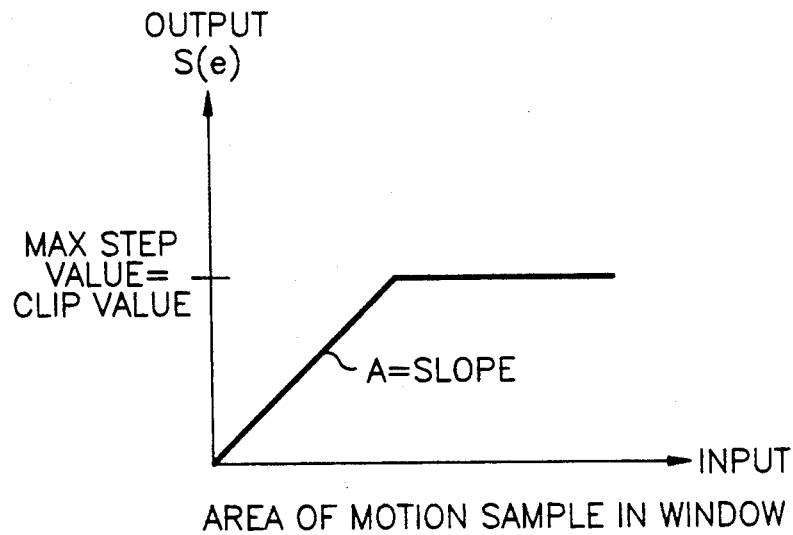
FIG. 7B shows a characteristic graph of the area detector in the event that the clipping process is performed.
Figure 7C:
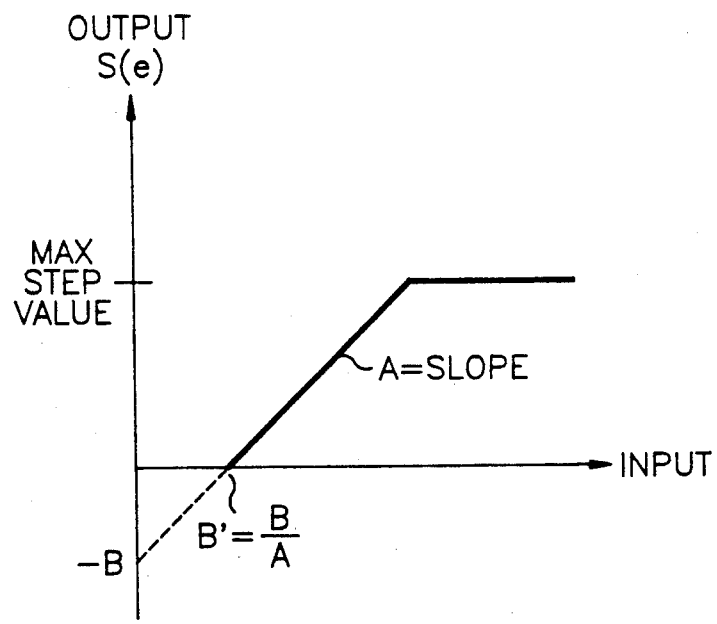
FIG. 7C shows another exemplary characteristic graph of the area detector in the event that the clipping process is performed.
Figure 7F:
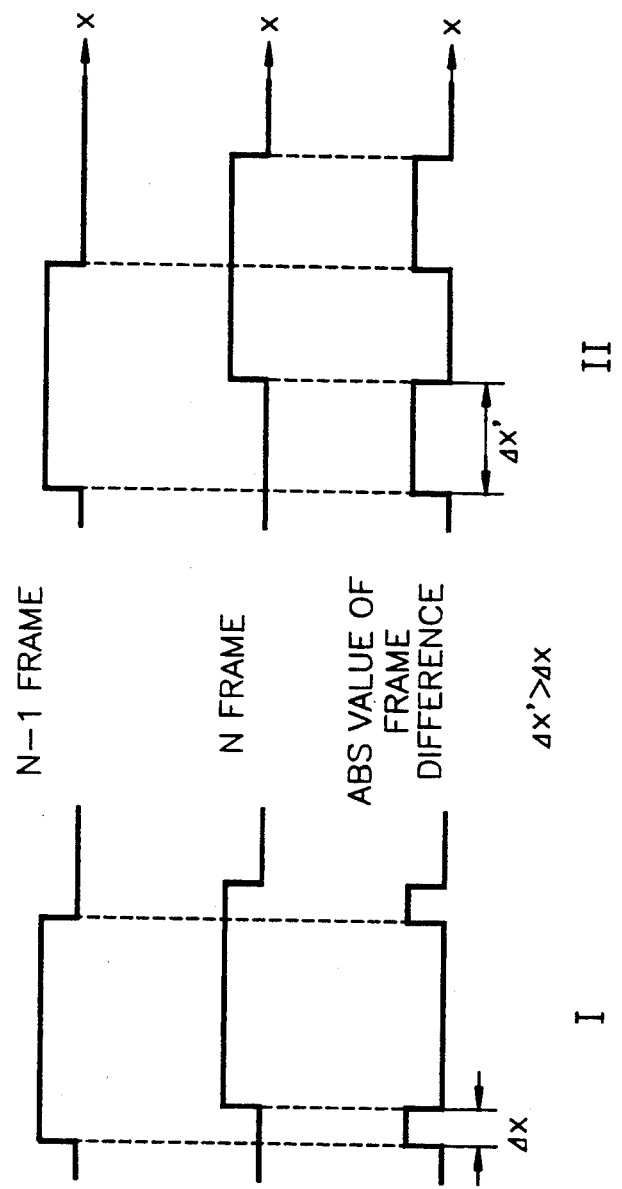
FIG. 7F shows a diagram of illustrating an operational characteristic of the area detector.

The theoretical basis of this process can be supported by the temporal correlation of the frame difference signal and, however, in view of the one dimensional as shown in FIG. 7F, the amount of motion can be presumed on the basis of the motions $\Delta x$ and $\Delta x'$ in the direction of the x axis. Therefore, if these signals are spread into two dimension, a new motion signal can be reconstructed which can be mapped into a gradual adaptive motion signal of 0 to 1, having the spatial correlation to the time axis or in accordance with the time axis, by re-processing the motion signal component which is over a specific value.

Figure 4:
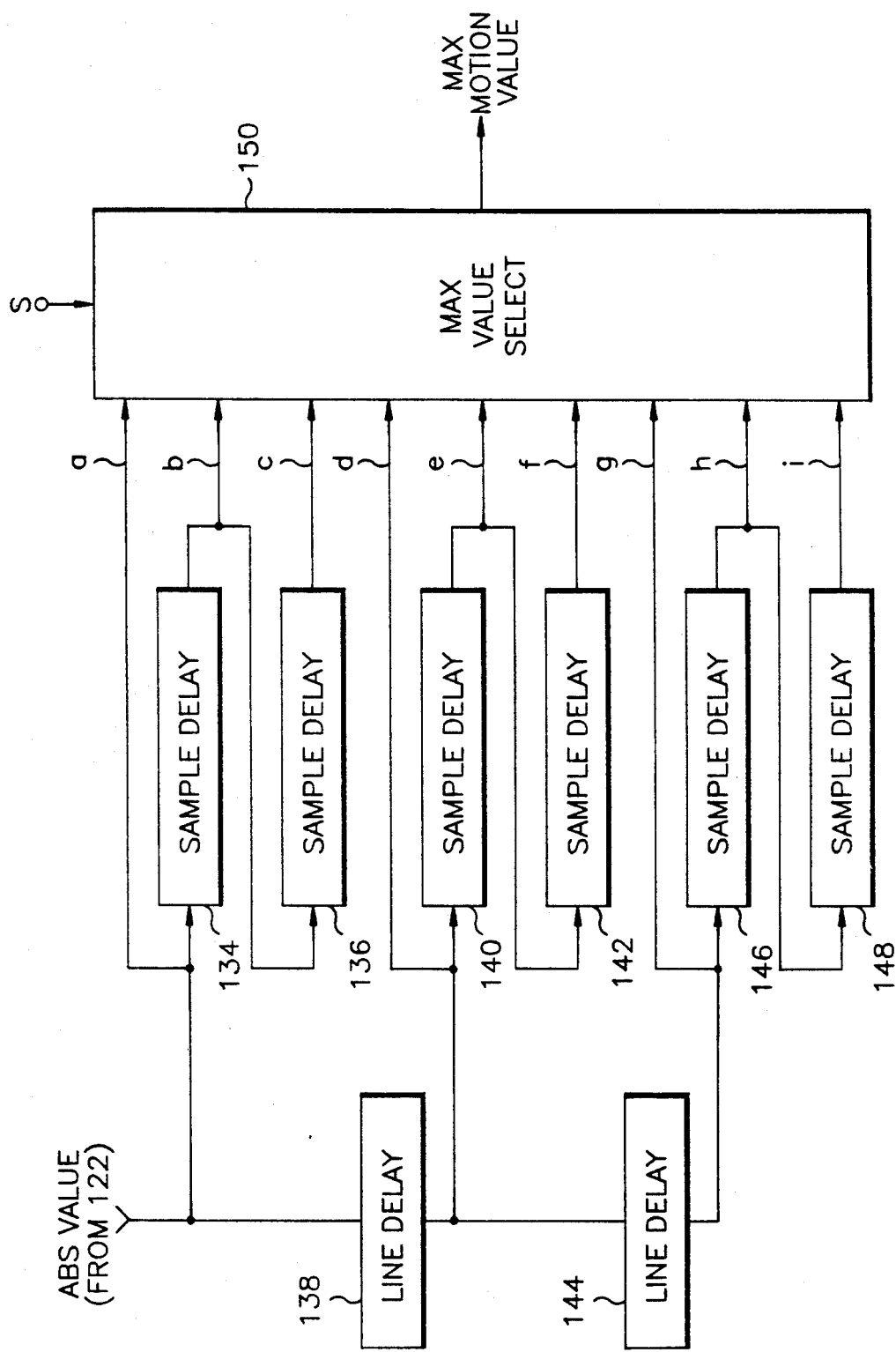
FIG. 4 shows a maximum value detector of FIG. 3 having a "3×3" image window.

In FIG. 4, the maximum value detector 128 of FIG. 3 is illustrated in detail. As shown specifically in the drawing, the maximum value detector 128 shows an exemplary circuit for a "3×3" rectangular image window, in which a comparator 150 with a selection terminal includes a plurality of sample delays 134, 136, 140, 142, 146, 148 and two line delays 138, 144. The maximum value detector 128 receives the absolute value of the spatial lowpass-filtered frame difference signal which is processed in sequence by means of the frame difference circuit 118, the spatial lowpass filter 120 and the absolute value circuit 122. In this case, a first image line is arranged with the signal "a" applied to the comparator 150 without delay, a signal "b" which is delayed by one sample by a sample delay 134, and a signal "c" which is a delayed signal of the signal "b".

In the mean time, a second image line is arranged with a line-delayed signal "d", which is delayed by one line by means of a line delay 138, which is applied to the comparator 150, a signal "e" which is delayed by one sample by means of a sample delay 140, and a signal "f" which is a delayed signal of the signal "e" by means of a sample delay 142.

Figure 5A:
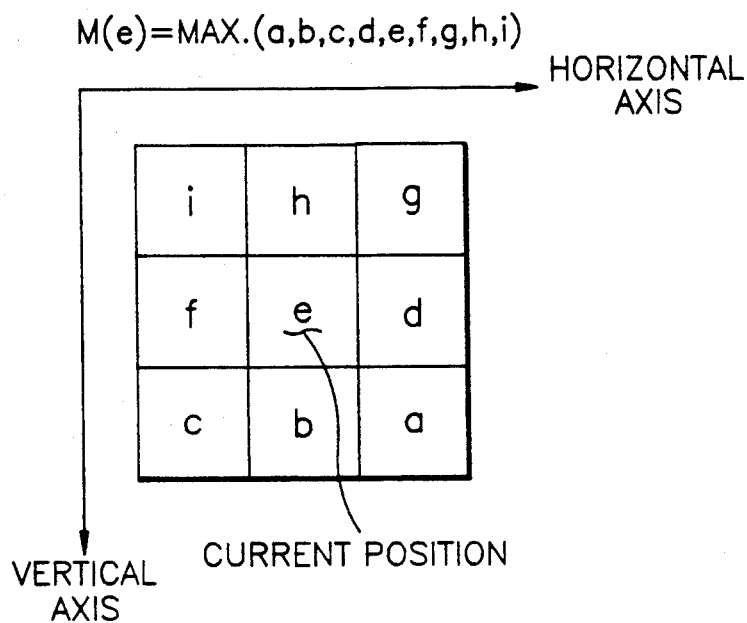
FIGS. 5A and 5B show "3×3" image windows taken for explaining the embodiment of the invention.

Furthermore, in order to arrange a third image line, a line delay 144 delays the output of the line delay 138 by one line which is provided to the comparator 150, a sample delay 146 delays the signal "g" by one sample which is provided to the comparator 150, and a sample delay 148 delays the signal "h" by one sample which is also applied to the comparator 150. The image signal obtained in the above described manner is as shown in FIG. 5A.

The comparator 150 compares the motion signals which are obtained by the sample delays and the line delays to generate a maximum value of the motion signals. In this case, the maximum value M(e) which is selected by the comparator 150 is $$M(e) = MAX(a, b, c, d, e, f, g, h, i) \tag{1}$$

where, M(e) represents the motion of current position "e".

Figure 5B:
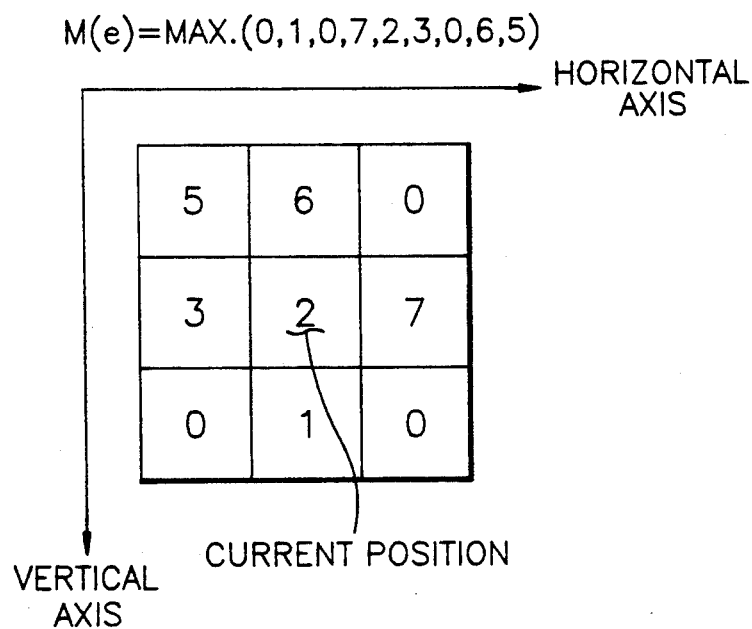

Referring to FIG. 5B, it shows an illustration of the "3×3" rectangular image window, of which respective pixels are replaced by specific substantial values. In this case, in accordance with the formula (1), the maximum value M(e) of the image window is represented as follows;

$$M(e) = MAX(5, 6, 0, 3, 2, 7, 0, 1, 0) = 7 \tag{2}$$

In this embodiment, when the threshold value THR which is set to the comparator 124 is 4, the maximum value of the image window shown in FIG. 5B will become 7 according to the formula 2. Therefore, the output of the comparator 124 generates the 1-bit motion signal of a value 1. As a result, the maximum value detector 128 will recognizes the current position "e" as a motion.

In this case, the spatial spreading of the motion area is implemented by selecting the maximum value of the image window by using the maximum value detector and thus reconstructed spatially, whereby the motions have correlations to one another.

Figure 6:
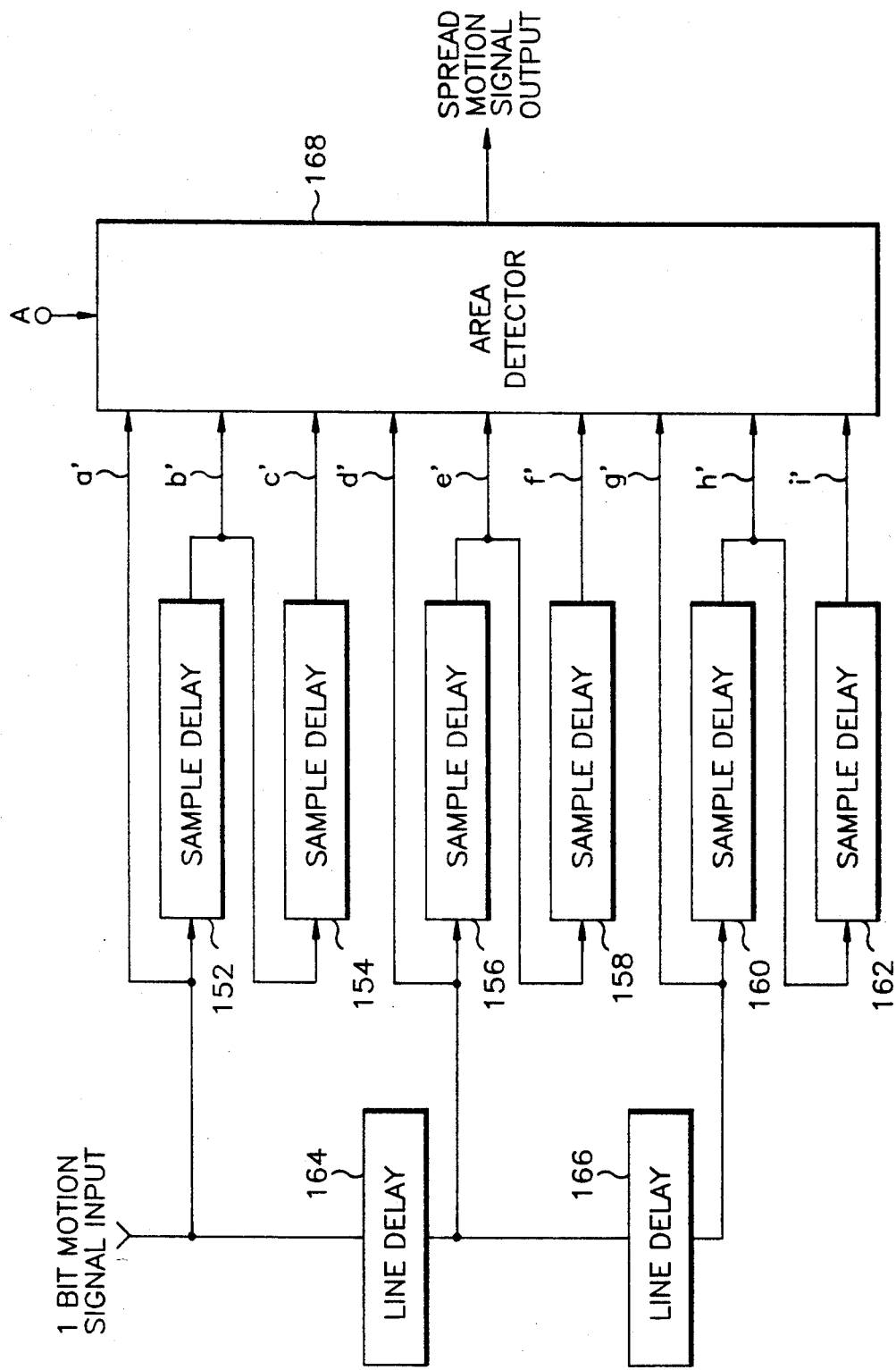
FIG. 6 shows an area detector of FIG. 3 having the "3×3" image window.

Referring to FIG. 6, the detailed block diagram of the area detector of FIG. 3, which is to presume the motion area by receiving the output of the comparator 124, it includes a number of sample delay circuits 152-162, two line delay circuits 164, 166, and an adder 168. In this area detector, the operation of the sample delay circuits 152-162 and the line delay circuits 164, 166 are same to that of the maximum value detector of FIG. 4, and only the difference, however, between them is that the comparator 150 with a selection switch shown in FIG. 4 is replaced by an area detector 168 embodied with an adder as illustrated in FIG. 6.

Namely, the motion signals which are applied to the area detector are 1-bit signals having only the values of "1" or "0". Therefore, the image window which is presumed by means of the respective sample delay circuits 152-16 and line delay circuits 164, 166 is as illustrated in FIG. 7A. The adder 168 counts the number of respective samples a'-i' with only the value "1". Thus, the characteristic formula of the area detector 130 can be represented as the following formula (3), $$S(e) = A \times (\text{Number of Motion Samples}) \quad (3)$$

where S(e) is the output of the adder 168 and A is the weight applied to the adder 168 to determine the slope of the characteristic curve.

The area detector 130 may be designed with a characteristic different from the formula (3). That is to say, the characteristic as represented in formula (4) can be obtained by providing a constant B to the formula (3).

$$S(e) = A \times (\text{Number of Motions Samples}) - B \quad (4)$$

The processing of the formula (4) is usually performed by the K value generator, but in this invention it can be performed by the area detector 130. Of course, in this case, the K value generator will be unnecessary (simply, it can be implemented by dividing the output of the area detector by a given maximum step value). At this moment, the meaning of the characteristic curve which is shifted toward the right hand side as illustrated in FIG. 7C is that a kind of spatial (or areal) threshold is established in order for the area detector 130 to spread the motion area only when the number of the motion signals over a predetermined value (B/A) are present at the image window.

The characteristic formula (3) represents a specific case of the formula (4) at which B=0. In this processing, the above result can be obtained when the motion is spread by an area detector not having the maximum value detection circuit. The area detector mentioned in this case has a feature of the spreading, different than above.

Referring to FIG. 7D, it shows a motion spreading of a rectangular image window when the constant A of the characteristic formula (3) is one (i.e., A=1). In relation to the image windows I, II, III of FIG. 7D, the image window I represents the window of the image samples applied from the comparator 124 to the area detector 130 while the image window II represents the image sample signals which are not clipped. In addition, the image window III represents the result of clipping process for the motion with the maximum step of seven. As can be understood from the drawing, it is noted that all the pixels in the image window, having the levels of eight and nine, are clipped to the maximum step value of seven. By limiting the maximum value of the area detector 130, the motion processing can be simplified, and the motion difference between the central portions of the motion regions and the still region can be also reduced, in case of a wide image window. Furthermore, FIG. 7E represents the motion spreading in case of a "5×5" diamond image window. Likewise, the image window III illustrates an image window II, of which image samples are clipped to the maximum step value of seven. In order to obtain the best effect of the invention, it should be noted that the size of image window constructed by the area detector 130 must be larger than that of the image window constructed by the maximum value detector 128.

Figure 8:
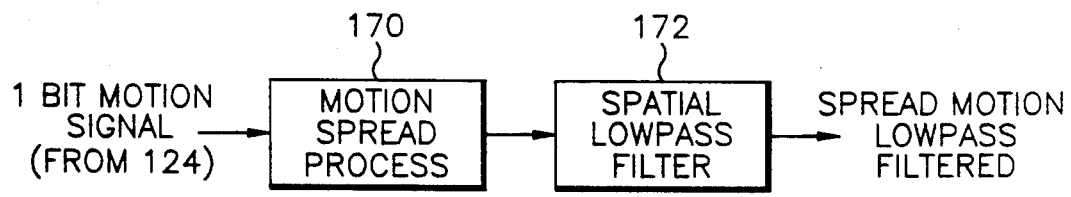
FIG. 8 shows diagram of the area detector connected to the spatial lowpass filter, for improving the smoothing characteristic.

Referring to FIG. 8, which shows another embodiment of the invention, it is a block diagram of circuit which replaces the area detector 130 of FIG. 3 in association with a spatial lowpass filter, when the slope A of the area detector 130 is set to a relative great value. In the drawing, motion spreader 170 is provided with the 1-bit motion signal from the comparator 124 and imposes the weight A on this signal so as to boost up the level of motion signal. In other words, if the weight A is 10, then the level difference between the respective levels will become 10 which may causes a rough motion spreading. Accordingly, in order to process the motion smoothly, a spatial lowpass filter 172 is used for lowpass-filtering. This circuit is more effective when the levels of the respective motion signals of the image window have discrete values.

Figure 10A:
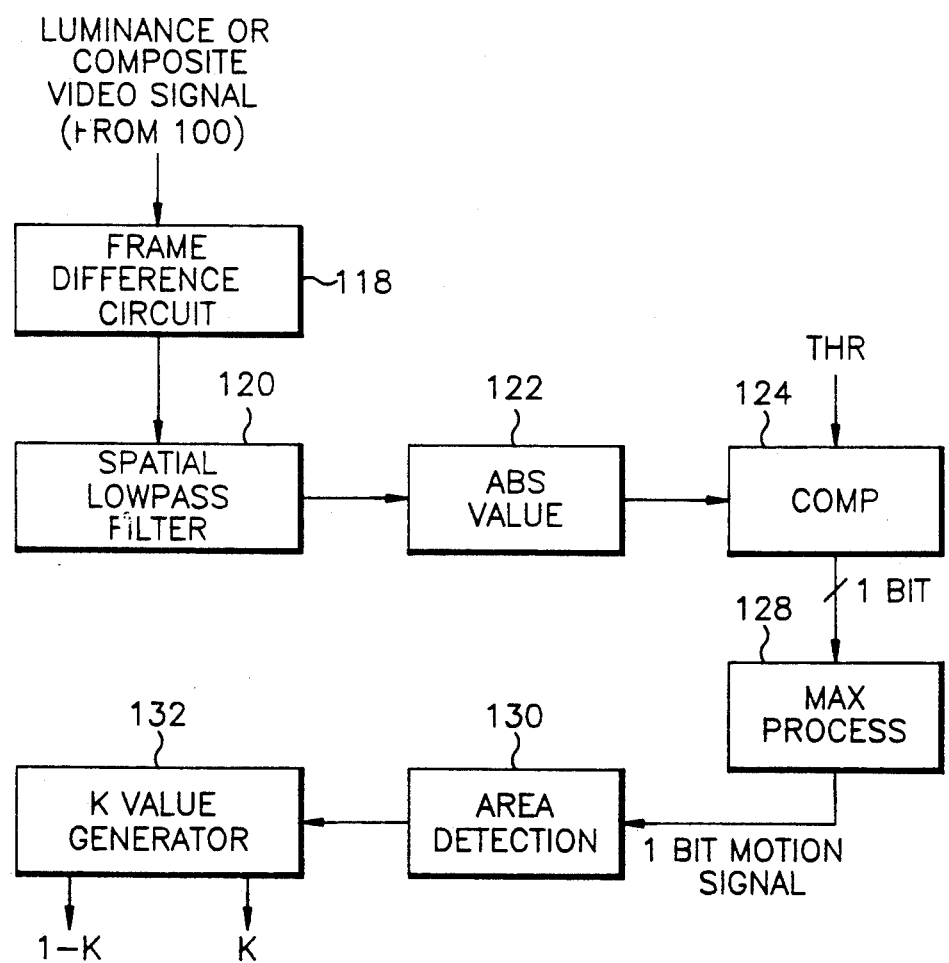
FIG. 10A shows a control signal spreader of FIG. 1 according to another embodiment of the invention.

In FIG. 10A which is another embodiment of the invention, it is a method in which the maximum value detector 128 is arranged at the output terminal of the comparator 124. The advantage of this circuit is that since the maximum value detector 128 processes only the 1-bit motion signal from the comparator 124, the hardware of the maximum value detector 128 can be easy manufactured.

Figure 10B:
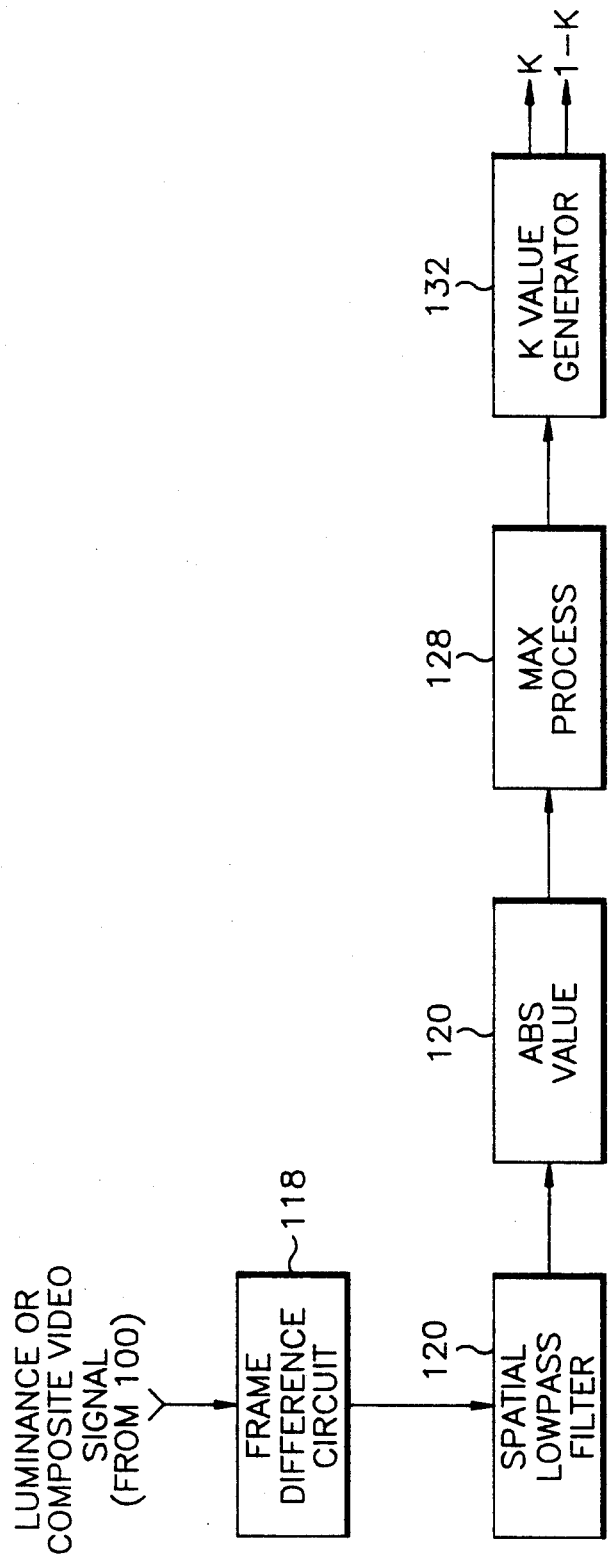
FIG. 10B shows a soft switching processor utilizing the full bit motion signal of the maximum value detector.

Referring to FIG. 10B which is a soft switching circuit by means of selecting a full-bit maximum value, this circuit generates the motion signals from 0 to 1 in accordance with the characteristic of the K value generator as shown in FIGS. 9A and 9B. In this case, the characteristic of FIG. 9B shows processing to reduce the output value when the input value is too big, in order to correct the motion signal which is spread excessively in case of a wide image window.

Figure 11A:
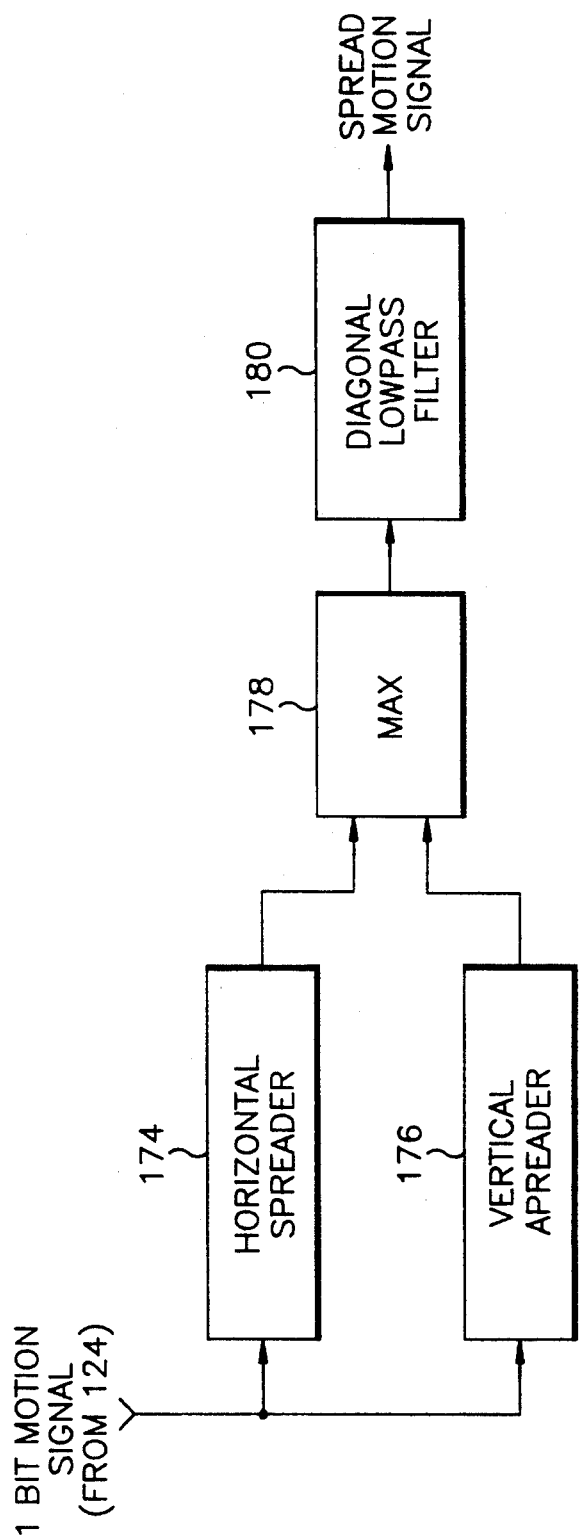
FIG. 11A shows a block diagram of a spatial spreader which can be replaced by the area detector of FIG. 3 according to another embodiment of the invention.
Figure 11B:
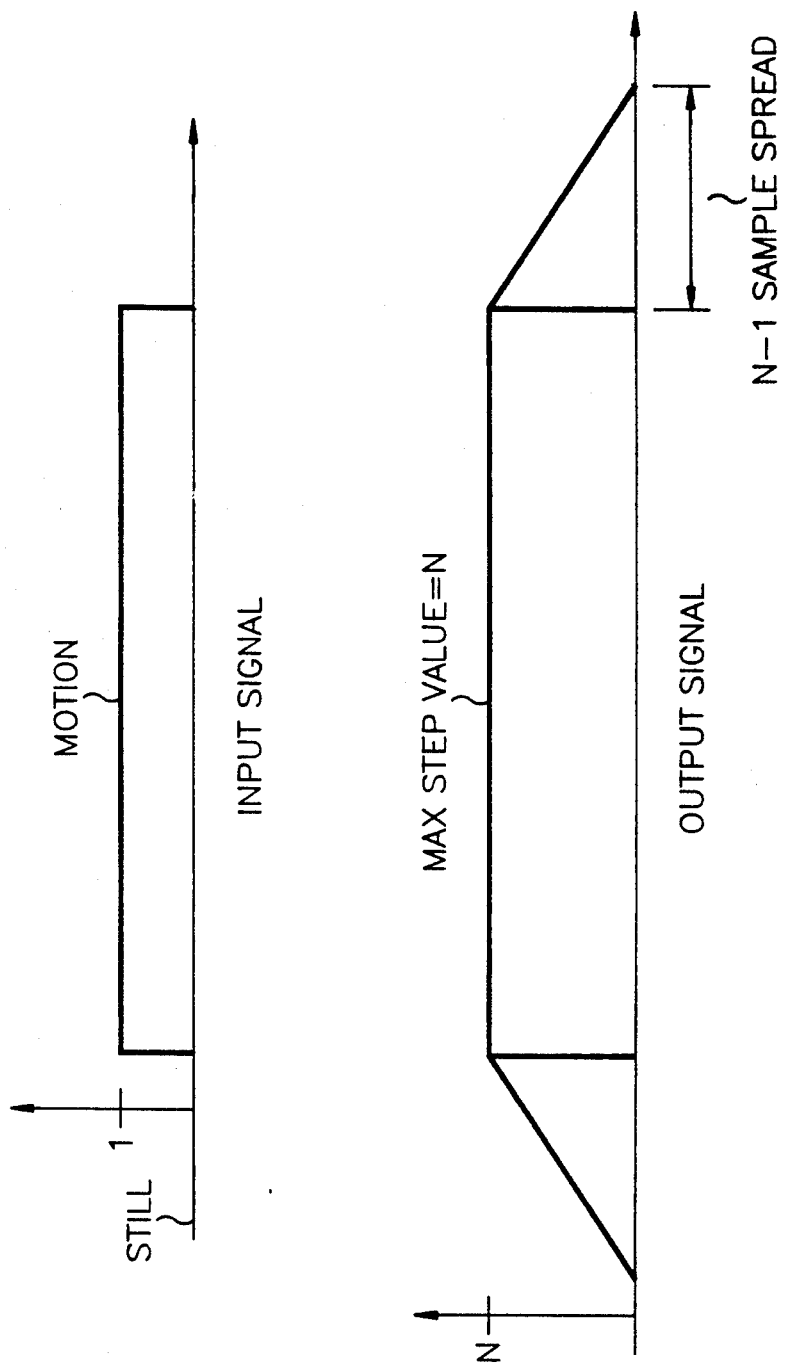
FIGS. 11B and 11C show respectively the one-dimensional output characteristics of the spatial spreader and the diagonal lowpass filter of FIG. 11A.

According to another embodiment of the invention, the area detector 130 of FIG. 3 can be replaced by a motion spreading circuit which is illustrated in FIG. 11A. That is to say, a horizontal spreader 174 spreads motion signal output from the comparator 124 horizontally and a vertical spreader 176 spreads this signal vertically. At this moment, if it is assumed that the vertical spreader 176 and the horizontal spreader 174 are matched with each other in their delay time, the maximum value detector 178 detects the maximum value from the signal outputs of the spreaders and applies the maximum value to a diagonal lowpass filter 180. The diagonal lowpass filter 180 spreads the motion signals diagonally which are in advance spread both in vertical and in horizontal, so as to spread the motion signals spatially close to the shape of a circle overall. In FIG. 11B, one-dimensional characteristic of the motion signals processed in such a manner is illustrated. In this case, if the maximum step value is of N, the motion signals are smoothed by N−1 in the direction of the spreading process. From the characteristic curve, it is shown that the discontinuous boundary area of the input signals is smoothed in output signals.

Figure 11C:
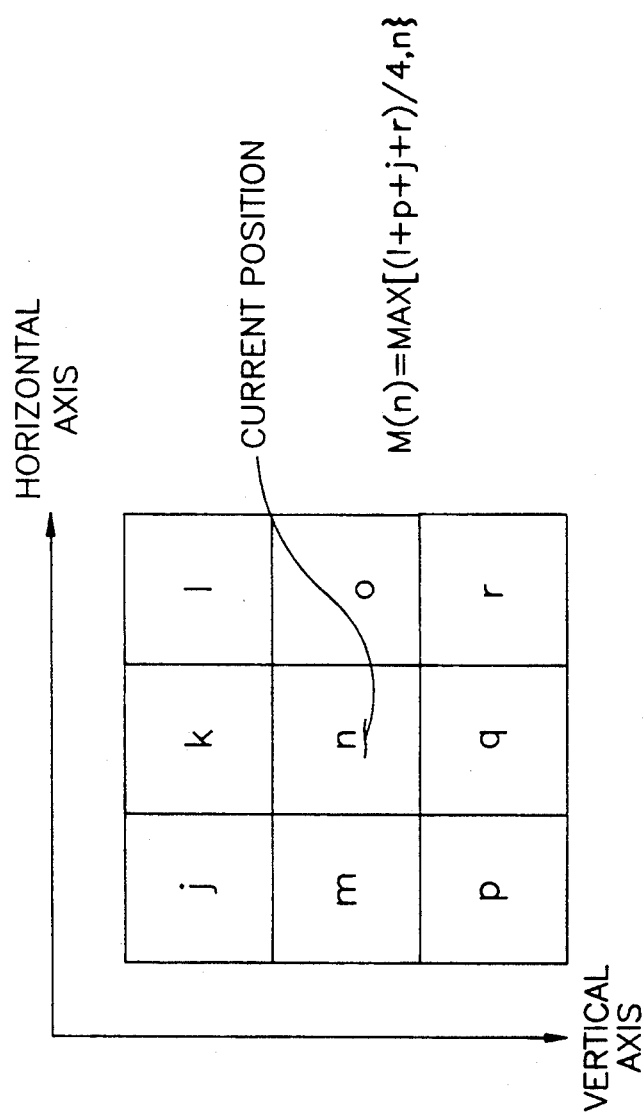

Referring to FIG. 11C, an image window by means of the diagonal lowpass filter is shown, in which the characteristic of the diagonal filter is illustrated in relation with the horizontal and vertical sample points, in case that the maximum value is 4. At this moment, the characteristic formula of the diagonal lowpass filter is represented as the following formula (5).

$$M(n) = MAX[(1+p+j+r)/4, n] \quad (5)$$

The formula (5) means that a value which is obtained by dividing by four the sum of the sample values in the diagonal direction, centering on the current sample point "n", is compared with the value of the current point value "n" so as to select the maximum value thereof.

Figure 12:
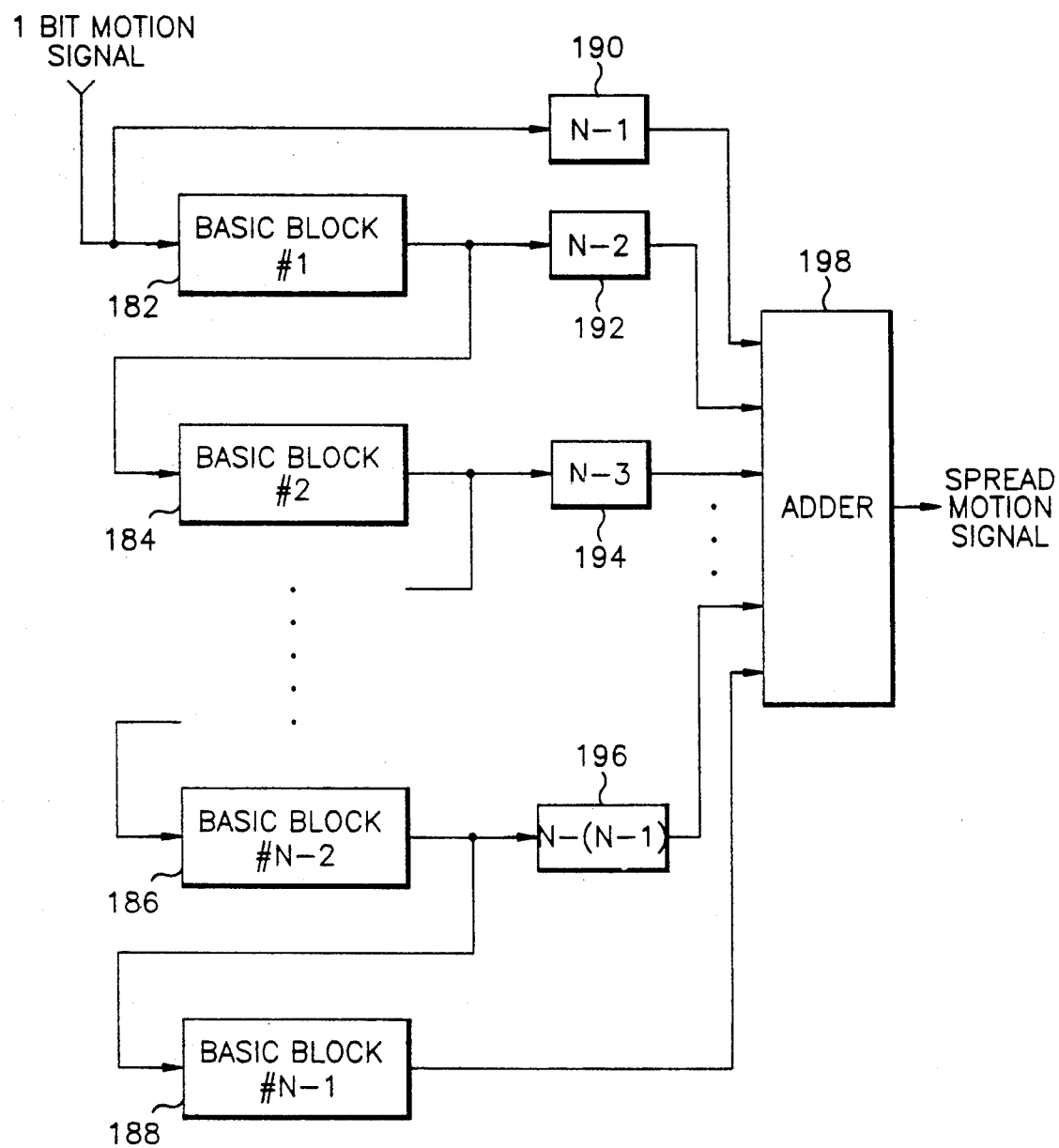
FIG. 12 shows a detailed diagram of the horizontal or vertical spreaders of FIG. 11A.
Figure 13A:
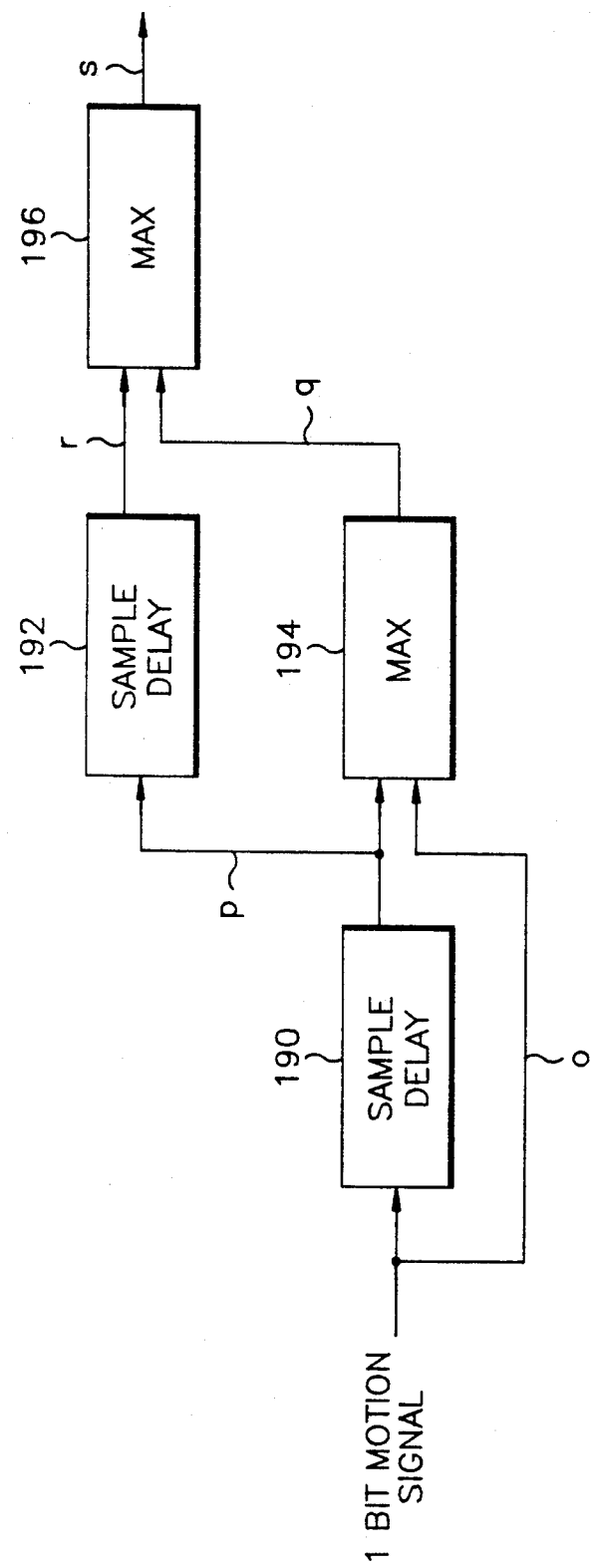

The block diagram shown in FIG. 12 is a detailed circuit diagram of the horizontal spreader 174 or/and the vertical spreader 176, which includes basic block cells 182–188 and delay circuits 190–196 and an adder 198. In addition, the respective basic block cells 182–188 include, as illustrated in FIG. 13A, sample delay circuits 190, 192 and maximum value circuits 194, 196 In this case, the intermediate values of the respective elements 190–196 are as shown in FIG. 13B. Namely, the respective basic block cells process the 1-bit motion signal "o" which is applied to the respective basic block cells in order to obtain motion signals "s" which are spread by one sample toward both the right and left hand sides, and which are delayed by one sample.

Figure 14A:
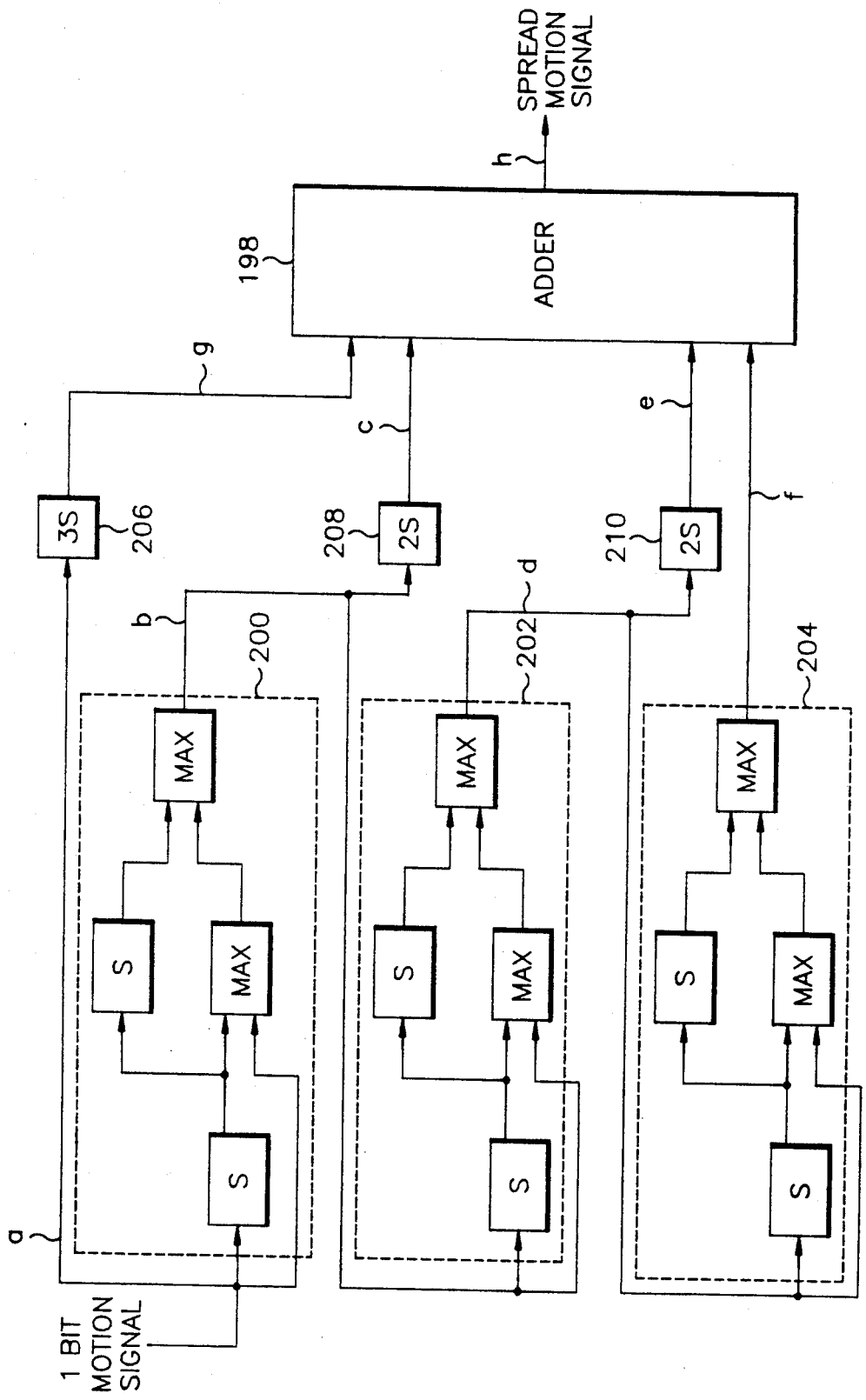

Referring to FIG. 14A, it is a complete diagram of FIG. 12 of which each basic block cell is replaced by the basic block cells of FIG. 13A. Therefore, in case that the maximum step value N=4, the intermediate values processed from the respective basic block cells 182–188 are applied to the adder 198 and added to each other, thereby to obtain the final motion signal which is spread. At this n. ment, the respective intermediate values are as shown in FIG. 14B. Namely, the resultant motion signal "h" with respect to the input motion signal "a" is of a motion signal which is spread with three samples delayed toward both the right and left hand sides. The above example is limited to the horizontal spreader but, in the same manner, the vertical spreading may be implemented. Namely, if the sample delay circuits are substituted with the line delay circuits, the vertical spreader can be constructed, in which the maximum value circuit, for a 1-bit input signal, can be embodied by means of an OR gate.

FIG. 15 illustrates, through the image windows, the intermediate values of the motion signals which are processed by the spatial spreader of FIG. 11A. That is to say, the image window I represents the motion signal inputs; the image window II represents the motion signals which are spread horizontally by the horizontal spreader 174; the image window III represents the motion signals which are spread vertically by the vertical spreader 176; and the image window IV represents the mixture of the spread signals of the image windows I and II by the maximum value detector 178. Furthermore, the image window V represents the resultant motion signals of the mixed signals shown in the image window IV, which are spread diagonally by means of the diagonal lowpass filter 180, whereby at last the motion signals are spread in all direction.

Furthermore, the adder 198 shown in FIG. 14A has a feature that clips the maximum step value in order to avoid the error during the signal processing. For instance, when the sum of the values applied to the adder 198 is a value greater than the maximum value, the output is limited to the maximum value.

In the processing described above, since the motion image is processed by the value which is spatially spread by the maximum value detector, the threshold value of the comparator must be a great value relatively.

Accordingly, as described heretofore, in order to reconstruct the motion adaptively according to the region of the 1-bit motion signal which is spread spatially, the invention adds the motion signal detected by the area detector to the motion value of or over a specific value in the time axis, which is spatially spread by the maximum value detector. In addition, since the maximum value of the output can be limited by clipping the area detected value or the size of the image window, the smoothing effect of the motion signal at the boundary area of the motion and through a wide motion region may be implemented.

Therefore, the great advantage of the invention is that since impulse noise which may be mis-recognized as a motion signal is processed to have a motion lower than that of conventional spreading processes, the inventive apparatus has good resistance to the noise. Furthermore, the hardware is simplified and, in practice, can be constructed by the combination of the logic elements because the motion signals are processed in 1-bit signals. Another particular feature of the invention is that the motion signals are reconstructed to be fit for the human's eye system by virtue of the spatial correlation. In case of the embodiment described in relation to FIG. 11A, it is characterized in that the original motions in the time axis are spread spatially in all directions close to the shape of a circle.

As described heretofore, although specific embodiments of the invention have been illustrated and described herein, it the invention is not limited to the above embodiments. One skilled in the art will easily recognize that the particular modifications or subconstructions may be used without departing from the scope and spirit of the invention. For instance, in the embodiments, although the maximum values of the motion are detected to process, minimum or intermediate values can also be used for the same processing. Furthermore, the size and shape of the image window can be adjusted to have a best condition according to the characteristics of the image processed, and motion signal processing for the time axis can be implemented in the same manner as descried above.

What is claimed is:

1. A motion signal processor in a digital video signal processing system, comprising:
   means for detecting a frame difference signal from a video signal;
   spatial lowpass filtering means for spatially lowpass-filtering the frame difference signal to generate a spatially low-pass filtered signal;
   means for taking an absolute value of the spatially low-pass filtered signal to generate an absolute value signal;

means for determining a maximum value of the absolute value signal so as to generate a maximum value signal having spatial correlation;

means for comparing the maximum value signal with a reference level to generate a comparator signal;

means for extrapolating a motion region from the comparator signal to generate an extrapolated motion signal being adaptively smoothed; and means for generating motion factors in response to the extrapolated motion signal;

whereby a resultant signal is spread smoothly based on the spatial correlation of the spatial spreading of the frame difference signal and by extrapolating a motion region from the spatial correlation of the comparator signal.

2. A motion signal spreader, as claimed in claim 1, wherein said maximum value determining means comprises:

comparison means for detecting a maximum value from a plurality of input signals to generate said maximum value signal;

first delay means for delaying the absolute value signal by one sample period to generate a first signal, said first signal being received by said comparison means;

second delay means for delaying the first signal by one sample period to generate a second signal, said second signal being received by said comparison means;

third delay means for delaying the absolute value signal by one line period to generate a third signal, said third signal being received by said comparison means;

fourth delay means for delaying the third signal by one sample period to generate a fourth signal, said fourth signal being received by said comparison means;

fifth delay means for delaying the fourth signal by one sample period to generate a fifth signal, said fifth signal being received by said comparison means;

sixth delay means for delaying the third signal by one line period to generate a sixth signal, said sixth signal being received by said comparison means;

seventh delay means for delaying the sixth signal one sample period to generate a seventh signal, said seventh signal being received by said comparison means; and eighth day means for delaying the eighth signal by one sample period to generate an eighth signal, said eighth signal being received by said comparison means;

whereby the maximum value signal is reconstructed to have spatial correlation.

3. A motion signal spreader a claimed in claim 1, wherein said comparator signal is a 1-bit signal.

4. The motion signal spreader as recited in claim 3, wherein said extrapolating means comprises:

a motion spreader for imposing a predetermined weight on said comparator signal to increase the level of pixels in the image signal; and means for smoothing the output of said motion spreader.

5. A motion signal spreader as claimed in claim 1, wherein said extrapolating means comprises:

an adder for adding a plurality of input signals to generate said extrapolated motion signal;

ninth delay means for delaying the comparator signal by one sample period to generate a ninth signal, said ninth signal being received by said adder;

tenth delay means for delaying the ninth signal by one sample period to generate a tenth signal, said tenth signal being received by said adder;

eleventh delay means for delaying said comparator signal by one line period to generate a eleventh signal, said eleventh signal being received by said adder;

twelfth delay means for delaying the eleventh signal by one sample period to generate a twelfth signal, said twelfth signal being received by said adder;

thirteenth delay means for delaying the twelfth signal by one sample period to generate a thirteenth signal, said thirteenth signal being received by said adder;

fourteenth delay means for delaying the eleventh signal by one line period to generate a fourteenth signal, said fourteenth signal being received by said adder;

fifteenth delay means for delaying the fourteenth signal by one sample period to generate a fifteenth signal, said fifteenth signal being received by said adder; and sixteenth delay means for delaying the fifteenth signal by one sample signal period to generate a sixteenth signal, said sixteenth signal being received by said adder.

6. A motion signal spreader as claimed in claim 5, wherein said adder is provided with a weight to boost a level of the comparator signal.

7. The motion signal spreader as recited in claim 1, wherein said extrapolating means comprises an adder with a selection terminal for receiving said comparator signal through a plurality of sample delays and line delays to extrapolate the motion region spatially according to the maximum value selected by said maximum value determining means.

8. The motion signal spreader as recited in claim 5, wherein said adder is provided with a weight to change the level of said comparator signal.

9. The motion signal processor of claim 1, wherein said extrapolating means comprises:

a horizontal spreader coupled to receive said comparator signal, for horizontally spreading said motion region to generate a horizontal spreader signal;

a vertical spreader coupled to receive said comparator signal, for vertically spreading said motion region to generate a vertical spreader signal;

a maximum value detector for detecting the maximum value from said horizontal spreader signal and said vertical spreader signal to generate a maximum value detector signal; and a diagonal lowpass filter means for diagonally spreading and smoothing said maximum value detector signal.

10. A motion signal spreader as claimed in claim 1, wherein said adder boosts a level of the 1-bit motion signal input from the comparison means and adds a constant, whereby the motion area is spread when the quantity of motion signals is greater than a predetermined value.

11. A motion signal processor in a digital video signal processing system, comprising:

means for detecting a frame difference signal from a video signal;

means for spatially lowpass-filtering said frame difference signal;

means for producing absolute values of said spatially lowpassed signal;

comparator means for comparing said absolute values with a predetermined threshold value to generate a comparator signal;

means for determining maximum value of said comparator signal to provide spatial correlation and thereby generate a maximum value signal;

area detecting means receiving said maximum value signal and generating an area detected signal by extrapolating a motion region and adaptively smoothing said motion region; and means for generating motion factors by processing said area detected signal, whereby said motion region is spread based on said spatial correlation.

12. The motion signal spreader of claim 11, wherein said area detecting means comprises:

an adder for adding the 10-bit motion signal from the comparison means to other motion signals output from other delay means;

means for coupled said 1-bit motion signal input to said adder, first delay means coupled to said coupled means, for delaying the 1-bit motion signal input by one sample so as to provide the signal to the adder;

second delay means coupled to said first delay means, for delaying the signal delayed by said ninth delay means by one sample so as to provide to the adder;

third delay means for delaying said 1-bit motion signal input by one line to provide to the adder;

fourth delay means coupled to said third delay means, for delaying the signal delayed by said third delay means by one sample so as to provide the signal to the adder;

fifth delay means coupled to said fourth delay means, for delaying the signal delayed by the fourth delay means by one sample so as to provide the signal to the adder;

sixth delay means coupled to said second delay means, for delaying to signal one-line-delayed by the second delay means by one line so as to provide the signal to the comparator;

seventh delay means coupled to said sixth delay means, for delaying the signal delayed by the sixth delay means by one sample so as to provide to the signal to the adder; and eighth delay means coupled to said seventh delay means, for delaying the signal delayed by the seventh delay means by one sample signal to provide to the adder;

whereby the motion signals are reconstructed to have the spatial corrections by detecting the motional area of an image window, utilizing the motion in time axis which is over a predetermined value, and which is spread spatially by the maximum value detection means.

13. A motion signal processor in a digital video signal processing system, comprising:

means for detecting a frame difference signal;

means coupled to said detecting means, for spatially lowpass-filtering said frame difference signal;

means coupled to said spatial lowpass filtering means, for producing absolute values of said spatially lowpassed signal;

means coupled to said absolute value producing means, for determining maximum values of said absolute values to provide the motion signal with a spatial correlation; and means for selecting a full-bit motion signal from said maximum value determining means to generate control signals of K value and $K-1$, wherein K is an integer value between 0 and 1.

14. The motion signal spreader as recited in claim 13, wherein said maximum value determining means comprises:

comparison means for comparing said absolute values with delayed absolute values to detect said maximum values;

means for connecting said maximum value values to said comparison means;

first delay means coupled to said connecting means, for delaying said maximum values by one sample period to provide a first delayed signal to said comparison means;

second delay means coupled to said first delay means, for delaying the first delayed signal by one sample period to provide a second delayed signal to said comparison means;

third delay means for delaying said maximum values by one line to provide third delayed signal to said comparison means;

fourth delay means coupled to said third delay means, for delaying the third delayed signal by one sample to provide fourth delayed signal to said comparison means;

fifth delay means coupled to said fourth delay means, for delaying the fourth delayed signal by one sample to provide a fifth delayed signal to said comparison means;

sixth delay means coupled to said third delay means, for delaying the third delayed signal by one line to provide a sixth delayed signal to said comparison means;

seventh delay means coupled to said sixth delay means, for delaying the sixth delayed signal by one sample to provide a seventh delayed signal to said comparison means; and eighth delay means coupled to said seventh delay means, for delaying the seventh delayed signal by one sample to provide an eighth delayed signal to said comparison means; whereby said motion region is reconstructed to have spatial correlation.

15. A method for processing the motion signal in a digital video signal processing system, comprising the steps of:

detecting a frame difference signal;

spatially lowpass-filtering said frame difference signal;

producing absolute values from said spatially lowpassed signal;

determining maximum values from said absolute values to provide a motion signal with a spatial correlation using a selected sized image window;

comparing said determined maximum values with a predetermined threshold value to generate a 1-bit motion signal;

extrapolating said spatial correlation of said 1-bit motion signal to adaptively smooth an extrapolated motion signal; and generating motion factor values from said extrapolated motion signal.

16. The method for processing the motion signal as recited in claim 15, wherein said step of extrapolating the 1-bit motion signal is carried out by a motion spreader coupled to receive said 1-bit motion signal, for imposing a predetermined weight on said motion signal to increase the level of pixels in the image signal, and a spatial lowpass filter for smoothing the output of said motion spreader.

17. The method for processing the motion signal as recited in claim 15, wherein said step of extrapolating the 1-bit motion signal comprises summing said 1-bit motion signal received through a plurality of sample delays and line delays to extrapolate a motion region.

18. The method for processing the motion signal as recited in claim 17, wherein a predetermined weight is added to the sum of said 1-bit motion signal received through said plurality of sample delays and line delays to increase the level of pixels of an image signal.

19. A motion signal processor in a digital video signal processing system, comprising:
  frame difference detecting means for comparing successive frames of a video signal and generating frame difference signals indicative of image motion in said video signal;
  spatial low-pass filter means for spatially low-pass filtering said frame difference signals;
  absolute value means for taking an absolute value of the spatially low-pass filtered frame difference signals by generating absolute values corresponding to component signals of said spatially low-pass filtered frame difference signals;
  value assignment mean for generating value assignment signals by forming successive first image windows from said absolute values, and successively providing individual ones of said absolute values within each of said first image windows as said value assignment signals;
  comparator means for successively generating one bit comparator signals, said one bit comparator signals being dependant upon whether constituent signals of said value assignment signals exceed a threshold value; and
  motion extrapolation means for generating motion extrapolation signals by successively forming second image windows from said one bit comparator signals and successively providing said motion extrapolated signals in dependence upon sums of said one bit comparator signals in said second image windows.

20. The motion signal processor, as claimed in claim 19, wherein said value assignment means provides a greatest of said absolute values within each of said first image windows as said value assignment signals.

21. The motion signal processor, as claimed in claim 19, wherein said motion extrapolation signals are said sums of said one bit comparator signals in said second image windows.

22. The motion signal processor, as claimed in claim 19, wherein said motion extrapolation signals are clipped sums of said one bit comparator signals in said second image windows.

23. The motion signal processor, as claimed in claim 19, wherein said motion extrapolation signals are said sums of said one bit comparator signals multiplied by a constant.

24. The motion signal processor, as claimed in claim 19, wherein said equal to motion extrapolation signals are said sums of said one bit comparator signals multiplied by a first constant plus a second constant.

25. The motion signal processor, as claimed in claim 19, wherein said image windows are larger than said first image windows.

26. The motion signal processor, as claimed in claim 19, wherein said motion signal processor further comprises K-value generator means for generating K-values in response to said motion extrapolation signals.

27. The motion signal processor, as claimed in claim 26, wherein said K-values are said motion extrapolation signals multiplied by a constant.

28. The motion signal processor, as claimed in claim 19, wherein said motion extrapolation signals are said sums of one-bit comparator signals in said second image windows divided by a maximum step value.

29. The motion signal processor, as claimed in claim 19, wherein said value assignment means comprises:
  second comparator means having a plurality of input terminals, for generating said value assignment signals in response to absolute values at said plurality of input terminals;
  a plurality of line delay means connected in series for receiving said absolute values, each delaying for time period equal to a line period; and
  a plurality of series connected plurality of sample delay means, wherein each of said plurality of series connected plurality of sample delay means has an input terminal, at least one middle terminal at a junction between said plurality of sample delay means, and an end terminal, each of said plurality of sample delay means delays for a sample period;
  said input terminal of each of said plurality of series connected plurality of sample delay means is connected to an output terminal of one of said plurality of line delay means; and
  said input terminal of each of said series connected plurality of sample delay means is connected to a different input terminal of said second comparator means, each of said at least one middle terminal of each of said plurality of series connected plurality of sample delay means is connected to a different input terminal of said second comparator means, and said end terminal of each of said plurality of series of connected plurality of sample delay means is connected to a different input terminal of said second comparator means.

30. The motion signal processor, as claimed in claim 29, wherein said plurality of line delay means consists of (number of lines said image window)−1 line delay means.

31. The motion signal processor, as claimed in claim 29, wherein said plurality of sample delay means consists of (number of samples per line)−1 sample 32. The motion signal processor, as claimed in claim 29, wherein said second comparator means selects a largest of said absolute values at said input terminals, 33. The motion signal processor, as claimed in claim 19, wherein said motion extrapolation means comprises:
  adder means having a plurality of input terminals, for generating said motion extrapolation signals in response to said one bit comparator signals at said plurality of input terminals;
  a plurality of line delay means connected in series for receiving said one bit comparator signals, each delaying for time period equal to a line period; and
  a plurality of series connected plurality of sample delay means, wherein each of said plurality of series connected plurality of sample delay means has a input terminal, at least one middle terminal at a junction between said plurality of sample delay means, and an end terminal, each of said plurality of sample delay means delays for a sample period.

said input terminal of each of said series connected plurality of sample delay means is connected to an output terminal of one of said plurality of line delay means; and said input terminal of each of said plurality of series connected plurality of sample delay means is connected to a different input terminal of said adder means, each of said at least one middle terminal of each of said plurality of series connected plurality of sample delay means is connected to a different input terminal of said adder means, and said end terminal of each of said plurality of series connected plurality of sample delay means is connected to a different input terminal of said adder means.

34. The motion signal processor, as claimed in claim 33, wherein said adder means comprises an adder for adding said one bit comparator signals at said plurality of input terminals.

35. The motion signal processor, as claimed in claim 33, wherein said plurality of line delay means consists of (number of lines said image window)−1 line delay means.

36. The motion signal processor, as claimed in claim 33, wherein each of said plurality of series connected plurality of sample delay means consists of (number of samples per line)−1 sample delay means.

37. The motion signal processor, as claimed in claim 19, wherein at least one of said first image windows and said second image windows are square shaped.

38. The motion signal processor, as claimed in claim 19, wherein at least one of said first image windows and said second image windows are diamond shaped.

39. A motion signal processor in a digital video signal processing system, comprising:
frame difference detecting means for comparing successive frame of a video signal and generating frame difference signals indicative of image motion in said video signal;
spatial low-pass filter means for spatially low-pass filtering said frame difference signals;
absolute value means for taking an absolute value of the spatially low-pass filtered frame difference signals by generating absolute values corresponding to component signals of said spatially low-pass filtered frame difference signals;
value assignment means for generating value assignment signals by forming successive first image windows from said absolute values, and successively providing individual ones of said absolute values within each of said first image windows as said value assignment signals;
comparator means for successively generating one bit comparator signals, said one bit comparator signals being dependant upon whether constituent signals of said value assignment signals exceed a threshold value;
motion extrapolation means for generating motion extrapolation signals, comprising:
motion spreader means for generating spread motion signals by boosting said one bit comparator signals and
spatial low-pass filter means for spatially low pass filtering said spread motion signals to generate said motion extrapolation signals.

40. The motion signal processor, as claimed in claim 39, wherein said value assignment means provides a greatest of said absolute values within each of said first image windows as said value assignment signals.

41. The motion signal processor, as claimed in claim 39, wherein said motion signal processor further comprises K-value generator means for generating K-values in response to said motion extrapolation signals.

42. The motion signal processor, as claimed in claim 39, wherein said value assignment means comprises:
second comparator means having a plurality of input terminals, for generating value assignment signals in response to absolute values at said plurality of input terminals;
a plurality of line delay means connected in series for receiving said absolute values, each delaying for time period equal to a line period; and
a plurality of series connected plurality of sample delay means, wherein each of said plurality of series connected plurality of sample delay means has an input terminal, at least one middle terminal at a junction between said plurality of sample delay means, and an end terminal, each of said plurality of sample delay means for a sample period;
said input terminal of each of said plurality of series connected plurality of sample delay means is connected to an output terminal of one of said plurality of line delay means; and
said input terminal of each of said series connected plurality of sample delay means is connected to a different input terminal of said second comparator means, each of said at least one middle terminal of each of said plurality of series connected plurality of sample delay means is connected to a different input terminal of said second comparator means, and said end terminal of each of said plurality of series of connected plurality of sample delay means is connected to a different input terminal of said second comparator means.

43. The motion signal processor, as claimed in claim 42, wherein said plurality of line delay means consists of (number of lines said image window)−1 line delay means.

44. The motion signal processor, as claimed in claim 42, wherein said plurality of sample delay means consists of (number of samples per line)−1 sample delay means.

45. The motion signal processor, as claimed in claim 42, wherein said comparator means selects a largest of said absolute values at said input terminals.

46. A motion signal processor in a digital video signal processing system, comprising:
frame difference detecting means for comparing successive frames of a video signal and generating frame difference signals indicative of image motion in said video signal;
spatial low-pass filter means for spatially low-pass filtering said frame difference signals;
absolute value means for taking an absolute value of the spatially low-pass filtered frame difference signals by generating absolute values corresponding to component signals of said spatially low-pass filtered frame difference signals;
comparator means for successively generating one bit comparator signals, said one bit comparator signals being dependant upon whether said absolute values exceed a threshold value;

value assignment means for generating value assignment signals by forming successive first image windows from one bit comparator signals, and successively providing individual ones of said one bit comparator signals within each of said first image windows as said value assignment signals;

motion extrapolation means for generating motion extrapolation signals by successively forming second image windows from said value assignment signals and successively providing said motion extrapolated signals in dependance upon sums of said value assignment signals in said second image windows as said motion extrapolation signals.

47. The motion signal processor, as claimed in claim 46, wherein said value assignment means provides a greatest of said one bit comparator signals within each of said first image windows as said value assignment signals.

48. The motion signal processor, as claimed in claim 46, wherein said motion extrapolation signals are said sums of said value assignment signals in said second image windows.

49. The motion signal processor, as claimed in claim 46, wherein said motion extrapolation signals are clipped sums of said value assignment signals in said second image windows.

50. The motion signal processor, as claimed in claim 46, wherein said motion extrapolation signals are said sums of said value assignment signals multiplied by a constant.

51. The motion signal processor, as claimed in claim 46, wherein said motion extrapolation signals are said sums of said value assignment signals multiplied by a first constant plus a second constant.

52. The motion signal processor, as claimed in claim 46, wherein said second image windows are larger than said first image windows.

53. The motion signal processor, as claimed in claim 46, wherein said motion signal processor further comprises K-value generator means for generating a K-values in response to said motion extrapolation signals.

54. The motion signal processor, as claimed in claim 53, wherein said K-values are said motion extrapolation signals multiplied by a constant.

55. The motion signal processor, as claimed in claim 46, wherein said motion extrapolation signals are said sums of said value assignment signals in said second image windows divided by a maximum step value.

56. The motion signal processor, as claimed in claim 46, wherein said value assignment means comprises:
second comparator means having a plurality of input terminals, for generating said value assignment signals in response to absolute values at said plurality of input terminals;
a plurality of line delay means connected in series for receiving said absolute values, each delaying for time period equal to a line period; and
a plurality of series connected plurality of sample delay means, wherein each of said plurality of series connected plurality of sample delay means has an input terminal, at least one middle terminal at a junction between said plurality of sample delay means, and an end terminal, each of said plurality of sample delay means for a sample period;
said input terminal of each of said plurality of series connected plurality of sample delay means is connected to an output terminal of one of said plurality of line delay means; and
said input terminal of each of said series connected plurality of sample delay means is connected to a different input terminal of said second comparator means, each of said at least one middle terminal of each of said plurality of series connected plurality of sample delay means is connected to a different input terminal of said second comparator means, and said end terminal of each of said plurality of series of connected plurality of sample delay means is connected to a different input terminal of said second comparator means.

57. The motion signal processor, as claimed in claim 56, wherein said plurality of line delay means consists of (number of lines said image window)−1 line delay means.

58. The motion signal processor, as claimed in claim 56, wherein said plurality of sample delay means consists of (number of samples per line)−1 sample delay means.

59. The motion signal processor, as claimed in claim 56, wherein said second comparator means selects a largest of said one bit comparator signals at said input terminals.

60. The motion signal processor, as claimed in claim 46, wherein said motion extrapolation means comprises:
adder means having a plurality of input terminals, for generating motion extrapolation signals in response to said value assignment signals at said plurality of input terminals;
a plurality of line delay means connected in series for receiving said one bit comparator signals, each delaying for time period equal to a line period; and
a plurality of series connected plurality of sample delay means, wherein each of said plurality of series connected plurality of sample delay means has a input terminal, at least one middle terminal at a junction between said plurality of sample delay means, and an end terminal, each of said plurality of sample delay means delays for a sample period;
said input terminal of each of said series connected plurality of sample delay means is connected to an output terminal of one of said plurality of line delay means; and
said inputted terminal of each of said plurality of series connected plurality of sample delay means is connected to a different input terminal of said adder means, each of said at least one middle terminal of each of said plurality of series connected plurality of sample delay means is connected to a different input terminal of said adder means, and said end terminal of each of said plurality of series connected plurality of sample delay means is connected to a different input terminal of said adder means.

61. The motion signal processor, as claimed in claim 60, wherein said adder means comprises an adder for adding said value assignment signals at said plurality of input terminals.

62. The motion signal processor, as claimed in claim 60, wherein said plurality of line delay means consists of (number of lines said image window)−1 line delay means.

63. The motion signal processor, as claimed in claim 60, wherein each of said plurality of series connected plurality of sample delay means consists of (number of samples per line)−1 sample delay means.

64. A motion signal processor in a digital video signal processing system, comprising:

frame difference detecting means for comparing successive frames of a video signal and generating frame difference signals indicative of image motion in said video signal spatial low-pass filter means for spatially low-pass filtering said frame difference signals;

absolute value means for taking an absolute value of the spatially low-pass filtered frame difference signals by generating absolute values corresponding to component signals of said spatially low-pass filtered frame difference signals;

value assignment means for generating value assignment signals by forming successive first image windows from said absolute values, and successively providing individual ones of said absolute values within each of said first image windows as said value assignment signals;

comparator means for successively generating one bit comparator signals, said one bit comparator signals being dependant upon whether constituent signals of said value assignment signals exceeded a threshold value;

motion extrapolation means for generating motion extrapolation signals, comprising:
- horizontal spreader means for generating an horizontal spreader signals by spatially horizontally spreading said one bit comparator signals;
- vertical spreader means for generating a vertical spreader signals by spatially vertically spreading said one bit comparator signals;
- maximum value detector means for successively providing a maximum one of said horizontal spreader signals and said vertical spreader signals, as maximum value signals; and
- diagonal low pass filter means for generating said motion extrapolation signals by spatially diagonally low pass filtering said maximum value signal.

65. The motion signal processor, as claimed in claim 64, wherein said diagonal low pass filter means generates said each of said motion extrapolation signals in response to spatially corresponding four diagonally disposed in said maximum value signals, 66. The motion signal processor, as claimed in claim 64, wherein said diagonal low-pass filter assigns to said each of said motion extrapolation signals a maximum of said corresponding four diagonally disposed said maximum value signals.

67. The motion signal processor, as claimed in claim 64, wherein said horizontal spreading means comprises:
- a series connected plurality of basic block circuits having a first terminal receiving said one bit comparator signal, at least one middle terminal at a junction between said plurality of basic block circuits, and a last terminal;
- adder means having a plurality of input lines, wherein said first terminal connected to a first input line through a multiple sample delay, each of said at least one middle terminal is connected to a different second input line through a multiple sample delay, and said last terminal is connected to a third input line.

68. The motion signal processor, as claimed in claim 67, wherein each of said plurality of basic block circuits comprises:
- a first delay circuit for generating first delayed one bit comparator signals from said one bit comparator signals;
- a first maximum value circuit for successively generating first maximum values being one of said one bit comparator signals and said first delayed one bit comparator signals;
- a second delay circuit for generating second delayed one bit comparator signals from said first delayed one bit comparator signals;
- second maximum value circuit successively generating an output signals being a maximum one of said first maximum values and said second delay one bit comparator signals.

69. The motion signal processor, as claimed in claim 64, wherein said vertical spreading means comprises:
- a series connected plurality of basic block circuits having a first terminal receiving said one bit comparator signal, at least one middle terminal at a junction between said plurality of basic block circuits, and a last terminal;
- adder means having a plurality of input lines, wherein said first terminal is connected to a first one input line through a multiple delay, each of said at least one middle terminal is connected to a different second input line through a multiple line delay, and said last terminal is connected to a third input line.

70. The motion signal processor, as claimed in claim 69, wherein each of said basic block circuits comprises:
- a first delay circuit for generating first delayed one bit comparator signals from said one bit comparator signals;
- a first maximum value circuit for generating first maximum values being a greater one of said one bit comparator signals and said first delayed one bit comparator signals;
- a second delay circuit for generating second delayed one bit comparator signals from said first delayed one bit comparator signals;
- a second maximum value circuit successively generating an output signals being a maximum one of said first maximum values and said second delayed one bit comparator signals.

71. The motion signal processor, as claimed in claim 64, wherein said motion signal processor further comprises K-value generator means for generating K-values in response to said motion extrapolation signals.

72. The motion signal processor, as claimed in claim 64, wherein said value assignment means provides a greatest of said of said absolute values within each of said first image windows as said value assignment signals.

73. The motion signal processor, as claimed in claim 64, wherein said value assignment means comprises:
- second comparator means having a plurality of input terminals, for generating said value assignment signals in response to absolute values at said plurality of input terminals;
- a plurality of line delay means connected in series for receiving said absolute values, each delaying for time period equal to a line period; and
- a plurality of series connected plurality of sample delay means, wherein each of said plurality of series connected plurality of sample delay means has an input terminal, at least one middle terminal at a junction between said plurality of sample delay means, and an end terminal, each of said plurality of sample delay means for a sample period;
- said input terminal of each of said plurality of series connected plurality of sample delay means is connected to an output terminal of one of said plurality of line delay means; and said input terminal of each of said series connected plurality of sample delay means is connected to a different input terminal of said second comparator means, each of said at least one middle terminal of each of said plurality of series connected plurality of sample delay means is connected to a different input terminal of said second comparator means, and said end terminal to each of said plurality of series of connected plurality of sample delay means is connected to a different input terminal of said second comparator means.

74. The motion signal processor, as claimed in claim 73, wherein said plurality of line delay means consists of (number of lines said image window)−1 line delay means.

75. The motion signal processor, as claimed in claim 73, wherein said plurality of sample delay means consists of (number of samples per line)−1 sample delay means.

76. The motion signal processor, as claimed in claim 73, wherein said second comparator means selects a largest of said absolute values at said input terminals.

77. A motion signal processor in a digital video signal processing system, comprising:

frame difference detecting means for comparing successive frames of a video signal and generating frame difference signals indicative of image motion in said video signal;

spatial low-pass filter means for spatially low-pass filtering said frame difference signals;

absolute value means for taking an absolute value of the spatially low-pass filtered frame difference signals by generating absolute values corresponding to component signals of said spatially low-pass filtered frame different signals;

value assignment means for generating value assignment signals by forming successive first image windows from said absolute values, and successively providing individual ones of said absolute values within each of said first image windows as said value assignment signals K-value generator means for successively generating K-values in response to said value assignment signals.

78. The motion signal processor, as claimed in claim 77, wherein said value assignment means provides a greatest of said absolute values within each of said first image windows as said value assignment signals.

79. The motion signal processor, as claimed in claim 77, wherein said motion signal processor further comprises K-value generator means for generating K-values in response to said motion extrapolation signals.

80. The motion signal processor, as claimed in claim 77, wherein said value assignment means comprises:

second comparator means having a plurality of input terminals, for generating value assignment signals in response to absolute values at said plurality of input terminals;

a plurality of line delay means connected in series for receiving said absolute values, each delaying for time period equal to a line period; and a plurality of series connected plurality of sample delay means, wherein each of said plurality of series connected plurality of sample delay means has an input terminal, at least one middle terminal at a junction between said plurality of sample delay means, and an end terminal, each of said plurality of sample delay means delays for a sample period;

said input terminal of each of said plurality of series connected plurality of sample delay means is connected to an output terminal of one of said plurality of line delay means; and said input terminal of each of said series connected plurality of sample delay means is connected to a different input terminal of said second comparator means, each of said at least one middle terminal of each of said plurality of series connected plurality of sample delay means is connected to a different input terminal of said second comparator means, and said end terminal of each of said plurality of series of connected plurality of sample delay means is connected to a different input terminal of said second comparator means.

81. The motion signal processor, as claimed in claim 80, wherein said plurality of line delay means consists of (number of lines said image window)−1 line delay means.

82. The motion signal processor, as claimed in claim 80, wherein said plurality of sample delay means consists of (number of samples per line)−1 sample delay means.

83. The motion signal processor, as claimed in claim 80, wherein said second comparator means selects a largest of said absolute values at said input terminals.

* * * * *

UNITED STATES PATENT AND TRADEMARK OFFICE
CERTIFICATE OF CORRECTION

PATENT NO. : 5,166,788
DATED : 24 November 1992
INVENTOR(S) : Myeong-Hwan Lee

It is certified that error appears in the above-indentified patent and that said Letters Patent is hereby corrected as shown below:

| | | |
|---|---|---|
| Column 1, | line 18, | before "uses", insert --also--, and after "uses", delete "the"; |
| | line 19, | before "separate", change "so as to easily" to --to--; |
| Column 2, | line 11, | before "adder", change " a " to --an--; |
| | line 37, | before "when", change "$0 \leq K \leq 1$" to --$0<K<1$--; |
| Column 3, | line 45, | after "maximum", change "valve" to --value--; |
| | line 47, | after "presuming" insert, or extrapolating, --; |
| Column 5, | line 10, | after "experiment", insert comma -- , --; |
| | line 57, | after "the" (first occurrence), change "mean time" to --meantime--; |
| | line 59, | after "and", insert comma -- , --; |
| Column 3, | line 43, | after "maximum", change "valve" to --value--; |

UNITED STATES PATENT AND TRADEMARK OFFICE
CERTIFICATE OF CORRECTION

PATENT NO. :
DATED : 5,166,788
INVENTOR(S) : 24 November 1992
Myeong-Hwan Lee

It is certified that error appears in the above-indentified patent and that said Letters Patent is hereby corrected as shown below:

| | | |
|---|---|---|
| Column 6, | line 26, | after "the" (first occurrence), change "mean time" to --meantime--; |
| | line 67, | after "will", change "recognizes" to --recognize--; |
| Column 7, | line 21, | before "and", change "152-16" to --152-162--; |
| Column 9, | line 30, | before "In", insert period -- . --; |
| | line 45, | after "this", change "n.ment" to --moment--; |
| Column 10, | line 45, | before "the invention", delete "it"; |
| | line 54, | before "best", change " a " to --the--; |

IN THE CLAIMS

| | | |
|---|---|---|
| Column 11, | line 56, | after "spreader", change " a " to -- as--; |
| Column 16, | line 2, | before "image", insert --second--; |
| | line 52, | after "1 sample", insert --delay means.--; |
| | line 55, | after "terminals", change " , " to period -- . --; |

UNITED STATES PATENT AND TRADEMARK OFFICE
CERTIFICATE OF CORRECTION

Page 3 of 3

PATENT NO. : 5,166,788
DATED : 24 November 1992
INVENTOR(S) : Myeong-Hwan Lee

It is certified that error appears in the above-indentified patent and that said Letters Patent is hereby corrected as shown below:

| | | |
|---|---|---|
| Column 18, | line 24, | between "means" and "for", insert --delays--; |
| | line 50, | before "comparator", insert --second--; |
| Column 19, | line 64, | between "means" and "for", insert --delays--; |
| Column 20, | line 44, | before "terminal", change "inputted" to --input--; |
| Column 21, | line 4, | after "signal", insert semicolon -- ; --; |
| | line 21, | after "signals", change "exceeded" to --exceed--; |
| Column 22, | line 10, | after "second", change "delay" to --delayed--; |
| | line 21, | before "delay", insert --line--; |
| | line 66, | between "means" and "for", insert --delays--; |

Signed and Sealed this

Twenty-fourth Day of September, 1996

*Attest:*

BRUCE LEHMAN

*Attesting Officer*     *Commissioner of Patents and Trademarks*